(12) United States Patent
Shen et al.

(10) Patent No.: US 10,280,829 B2
(45) Date of Patent: May 7, 2019

(54) FLOW RATE CONTROL VALVE

(71) Applicant: HITACHI AUTOMOTIVE SYSTEMS, LTD., Hitachinaka-shi, Ibaraki (JP)

(72) Inventors: Zhenyu Shen, Zama (JP); Takeshi Yoshimura, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 15/579,471

(22) PCT Filed: Apr. 20, 2016

(86) PCT No.: PCT/JP2016/062458
§ 371 (c)(1),
(2) Date: Dec. 4, 2017

(87) PCT Pub. No.: WO2016/194502
PCT Pub. Date: Dec. 8, 2016

(65) Prior Publication Data
US 2018/0149073 A1    May 31, 2018

(30) Foreign Application Priority Data
Jun. 5, 2015  (JP) ................. 2015-114393

(51) Int. Cl.
*F01P 7/14*  (2006.01)
*F16K 11/087*  (2006.01)
(Continued)

(52) U.S. Cl.
CPC ............ *F01P 7/14* (2013.01); *F16K 11/0876* (2013.01); *F16K 27/067* (2013.01);
(Continued)

(58) Field of Classification Search
CPC ..... F01P 7/14; F01P 2007/146; F16K 27/067; F16K 11/0876; F16K 31/042; F16K 31/043
See application file for complete search history.

(56) References Cited

U.S. PATENT DOCUMENTS 6,568,428 B2 * 5/2003 Pecci .................... F16K 27/003
137/595
7,168,397 B2  1/2007 Chanfreau et al.
(Continued)

FOREIGN PATENT DOCUMENTS

JP      S40-035584      12/1965
JP      57-049953 U      9/1982
(Continued)

*Primary Examiner* — Hung Q Nguyen
(74) *Attorney, Agent, or Firm* — Foley & Lardner LLP

(57) ABSTRACT

Flow rate control valve CV has first housing 11 having introduction opening 10 opening in axial direction of hollow valve body accommodating portion 13 and introducing cooling water and first to third exhaust ports E1-E3, each of which is formed so as to have opening cross section that is smaller than that of introduction opening 10, radially communicates with valve body accommodating portion 13 and exhausts cooling water in valve body accommodating portion 13; and valve body 3 rotatably supported in valve body accommodating portion 13 and having opening portions M1-M3 whose overlap state with exhaust ports E1-E3 is changed according to rotation position of valve body 3. Opening cross section between introduction opening 10 and third opening portion M3 (exhaust port E3) is reduced in axial direction of valve body accommodating portion 13, thereby suppressing rapid reduction of flow passage sectional area and decreasing flow resistance of cooling water.

15 Claims, 21 Drawing Sheets

(51) Int. Cl.
   *F16K 27/06*   (2006.01)
   *F16K 31/04*   (2006.01)
(52) U.S. Cl.
   CPC .......... *F16K 31/042* (2013.01); *F16K 31/043* (2013.01); *F01P 2007/146* (2013.01)

(56) References Cited

U.S. PATENT DOCUMENTS

| | | | |
|---|---|---|---|
| 7,984,700 | B2 | 7/2011 | Chanfreau et al. |
| 9,670,825 | B2 * | 6/2017 | Murakami ............ F16K 11/085 |
| 2006/0201455 | A1 * | 9/2006 | Chanfreau ......... B60H 1/00485 |
| | | | 123/41.1 |
| 2015/0027572 | A1 * | 1/2015 | Morein ............... F16K 11/0876 |
| | | | 137/625.19 |

FOREIGN PATENT DOCUMENTS

| | | | |
|---|---|---|---|
| JP | 05-133482 | A | 5/1993 |
| JP | 2010-043555 | A | 2/2010 |
| JP | 4741794 | B2 | 8/2011 |
| JP | 2015-096736 | A | 5/2015 |

* cited by examiner

FLOW RATE CONTROL VALVE

TECHNICAL FIELD

The present invention relates to a flow rate control valve used for control of flow rate of, for instance, cooling water for a vehicle.

BACKGROUND ART

As a conventional flow rate control valve applied to the flow rate control of the cooling water for the vehicle, for instance, a flow rate control valve disclosed in the following Patent Document 1 is known.

This flow rate control valve is used for distribution control of the cooling water to auxiliary devices such as a radiator and a heater. The flow rate control valve has a substantially cylindrical housing whose axial direction one end side is open as an introduction port and which has a plurality of exhaust ports that are open on a peripheral wall of the housing, and a valve body which is rotatably accommodated at an inner peripheral side of the housing and whose axial direction one end side is open toward the introduction port and which has a plurality of opening portions on a peripheral wall of the valve body. The flow rate control valve can distribute the cooling water introduced from the introduction port to each auxiliary device according to a rotation position of the valve body, i.e. according to an overlap state between each opening portion and each exhaust port, through an inner peripheral side passage of the valve body and the opening portion and the exhaust port which are in the overlap state.

CITATION LIST

Patent Document

Patent Document 1: Japanese Patent No. JP4741794

SUMMARY OF THE INVENTION

Technical Problem

In the conventional flow rate control valve, however, since a flow passage sectional area of each exhaust port with respect to a flow passage sectional area of the introduction port is small and a flow passage sectional area between the introduction port and each exhaust port is reduced rapidly, when the cooling water flows out of the valve body from the inner peripheral side passage to each exhaust port, stagnation of the flow occurs at a flow passage sectional area reduction part. This causes a problem of increasing a flow resistance of the cooling water.

The present invention was made in view of the above technical problem. An object of the present invention is therefore to provide a flow rate control valve that is capable of reducing the flow resistance of fluid.

Solution to Problem

A flow rate control valve of the present invention comprises: a housing having an introduction opening which is formed so as to open in an axial direction of a hollow valve body accommodating portion and introduces fluid; and a plurality of exhaust ports, each of which is formed so as to have an opening cross section that is smaller than an opening cross section of the introduction opening, communicates with the valve body accommodating portion in a radial direction and exhausts the fluid in the valve body accommodating portion; and a valve body rotatably supported in the valve body accommodating portion and having a plurality of opening portions whose overlap state with the exhaust ports is changed according to a rotation position of the valve body. And, an opening cross section between the introduction opening and at least one of the exhaust ports is reduced in the axial direction of the valve body accommodating portion.

One aspect of the present invention, relating to reduction of the opening cross section, it is preferable that a bypass passage be provided at a radial direction outer side of the valve body in the valve body accommodating portion, and a secondary flow be formed by the bypass passage.

Another aspect of the present invention, relating to reduction of the opening cross section, it is preferable that an opening cross section of the housing or the valve body be gradually reduced. By gradually reducing the opening cross section, it is possible to effectively decrease the flow resistance of the cooling water.

Effects of Invention

According to the present invention, by reducing the opening cross section between the introduction opening and at least one of the exhaust ports in the axial direction of the valve body accommodating portion, rapid reduction of flow passage sectional area can be suppressed, and flow resistance of cooling water can be decreased.

BRIEF DESCRIPTION OF THE DRAWINGS

FIG. 7A shows a valve close state. FIG. 7B shows a valve open state.

FIG. 13A is a developed view of a valve body accommodating portion, showing an operating state in which all exhaust ports are in a non-communicating state. FIG. 13B is a developed view of the valve body accommodating portion, showing an operating state in which only a first exhaust port is in a communicating state. FIG. 13C is a developed view of the valve body accommodating portion, showing an operating state in which the first exhaust port and a second exhaust port are in the communicating state. FIG. 13D is a developed view of the valve body accommodating portion, showing an operating state in which all the exhaust ports are in the communicating state.

FIG. 16A is a perspective view, viewed from one side of a radial direction. FIG. 16B is a perspective view, viewed from the other side of the radial direction.

EMBODIMENTS FOR CARRYING OUT THE INVENTION

In the following description, each embodiment of a flow rate control valve according to the present invention will be explained with reference to drawings. In the embodiments, the flow rate control valve of the present invention will be explained with the flow rate control valve applied to a circulating system of vehicle cooling water (hereinafter, simply, called cooling water), which is the same as a conventional circulating system.

First Embodiment

Figure 1:
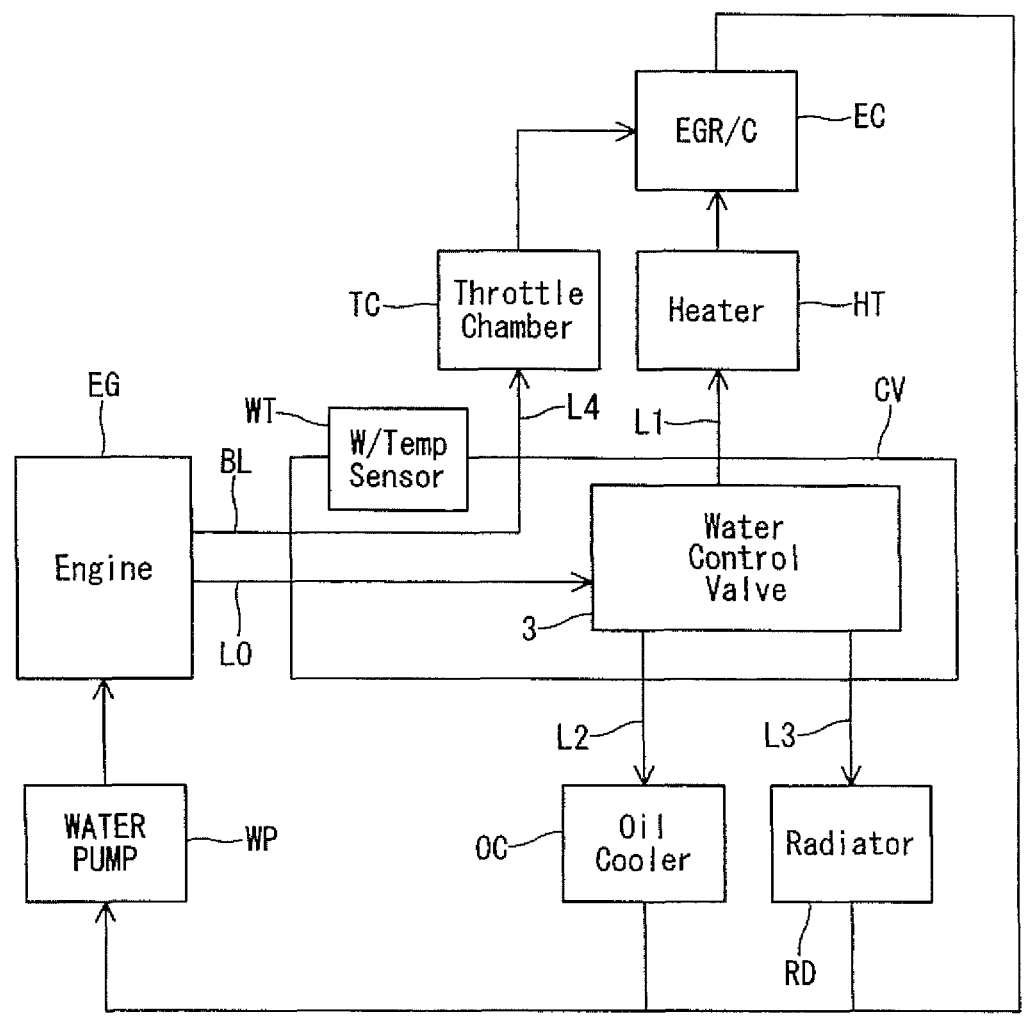
FIG. 1 is a circuit diagram of cooling water for explaining the application of a flow rate control valve of the present invention to a circulating system of the cooling water in a vehicle.

FIGS. 1 to 13 show a first embodiment of the flow rate control valve according to the present invention. First, a circulating circuit of the cooling water, to which this flow rate control valve CV is applied, will be explained. As shown in FIG. 1, the flow rate control valve CV is provided at a side portion (more specifically, a side portion of a cylinder head (not shown)) of an engine EG, and arranged between the engine EG, a heater heat exchanger HT (an EGR cooler EC), an oil cooler OC and a radiator RD. The flow rate control valve CV is configured to distribute the cooling water, which is pressurized by a water pump WP and introduced into the flow rate control valve CV through an introduction passage L0, to the heater heat exchanger HT side, the oil cooler OC side and the radiator RD side through first to third pipes L1 to L3, and to control each flow amount. Here, the cooling water introduced into the heater heat exchanger HT is introduced into the EGR cooler EC, and is returned to the engine EG side.

The flow rate control valve CV is provided with a bypass passage BL that directly introduces the cooling water to a throttle chamber TC by bypassing the introduction passage L0. This bypass passage BL allows the cooling water introduced from the engine EG side to be supplied to the throttle chamber TC all the time. The cooling water supplied to the throttle chamber TC is introduced into the EGR cooler EC and returned to the engine EG side through the EGR cooler EC, which is similar to the cooling water introduced into the EGR cooler EC from the heater heat exchanger HT. In FIG. 1, a reference sign WT denotes a water temperature sensor.

Figure 2:
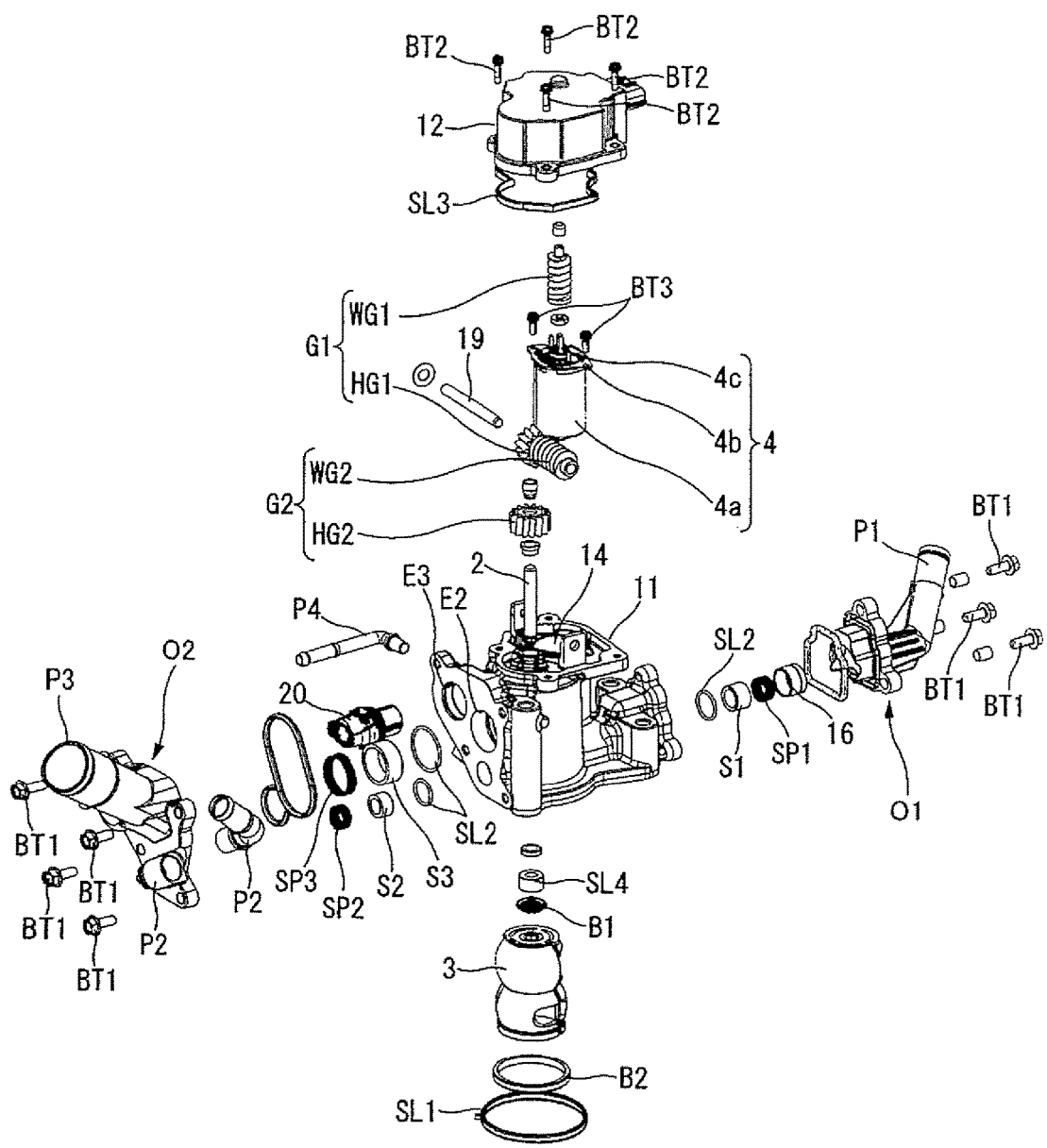
FIG. 2 is a perspective exploded view of the flow rate control valve of the present invention.
Figure 10:
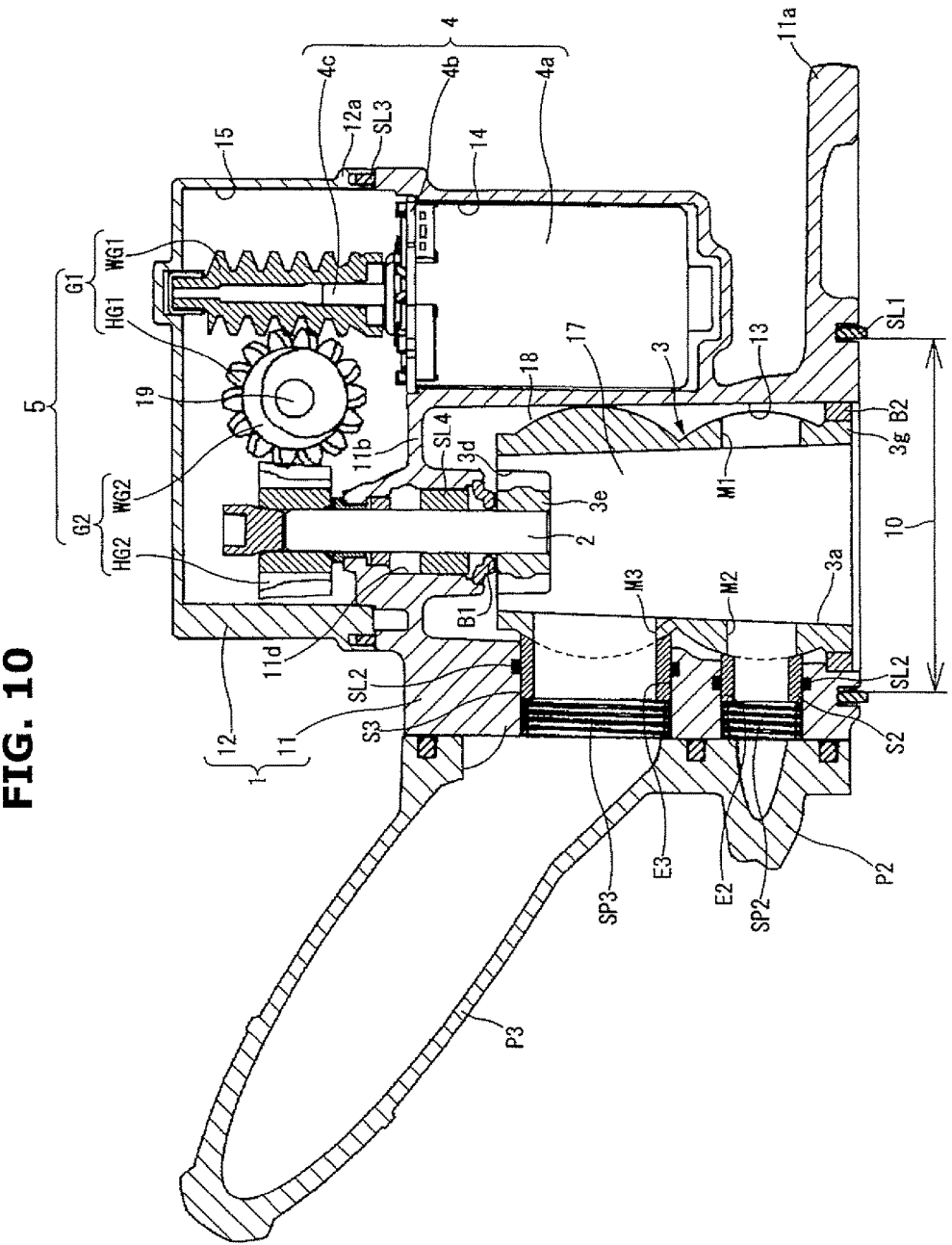
FIG. 10 is a longitudinal cross section of the flow rate control valve shown in FIG. 2.
Figure 11A:
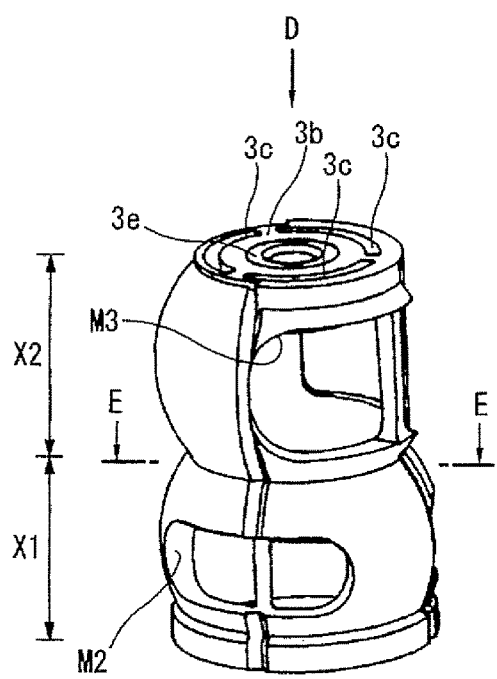
FIGS. 11A to 11D are perspective views of a valve body shown in FIG. 2, viewed from different directions.
Figure 11B:
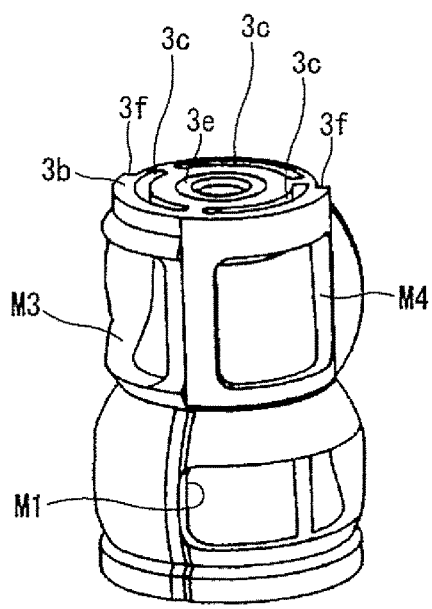
Figure 11C:
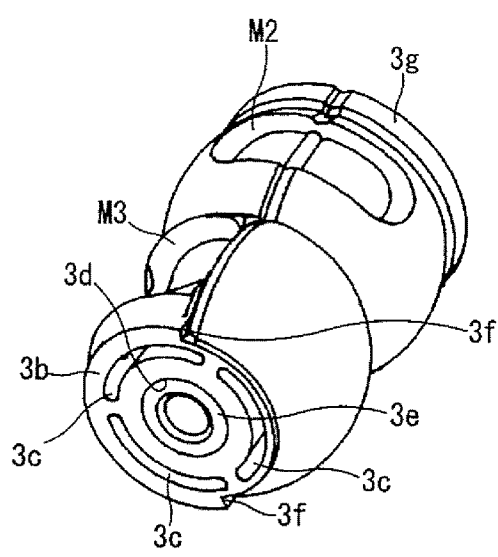
Figure 11D:
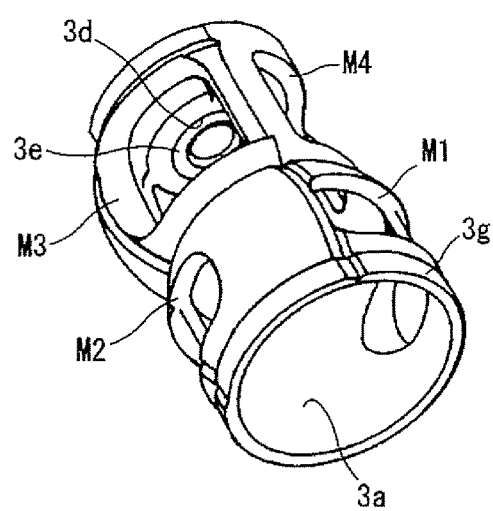

Next, a specific configuration of the flow rate control valve CV will be explained. As shown in FIGS. 2 and 10, the flow rate control valve CV is formed mainly by a housing 1 formed from a first housing 11 accommodating therein an after-mentioned valve body 3 and electric motor 4 and a second housing 12 accommodating therein an after-mentioned speed reduction mechanism 5, a rotation shaft 2 inserted into an end wall 11b of the first housing 11 by which the first housing 11 and the second housing 12 are divided and rotatably supported by a bearing B1 retained by the end wall 11b, the substantially cylindrical valve body 3 fixed to one end portion of the rotation shaft 2 and accommodated in the first housing 11, the electric motor 4 disposed parallel to the valve body 3 in the first housing 11 and used for drive control of the valve body 3, and the speed reduction mechanism 5 interposed between a motor output shaft 4c of the electric motor 4 and the rotation shaft 2 and transmitting rotation of the electric motor 4 with a rotation speed of the electric motor 4 reduced.

The first housing 11 is cast in aluminum alloy material. A substantially tubular valve body accommodating portion 13 arranged at one end side in a width direction and accommodating the valve body 3 is open toward one end side in an axial direction, and a substantially tubular motor accommodating portion 14 arranged at the other end side in the width direction and accommodating the electric motor 4 is open toward the other end side in the axial direction with the motor accommodating portion 14 being adjacent to the valve body accommodating portion 13. The first housing 11 is secured to a side portion of an engine (not shown) through a first flange portion 11a formed at an outer peripheral part of one end side opening of the valve body accommodating portion 13 with bolts (not shown). When securing the first housing 11, a ring-shaped seal member SL1 is inserted between the first flange portion 11a of the first housing 11 and the engine side portion, thereby ensuring liquid tightness of the valve body accommodating portion 13 by the seal member SL1.

Figure 8:
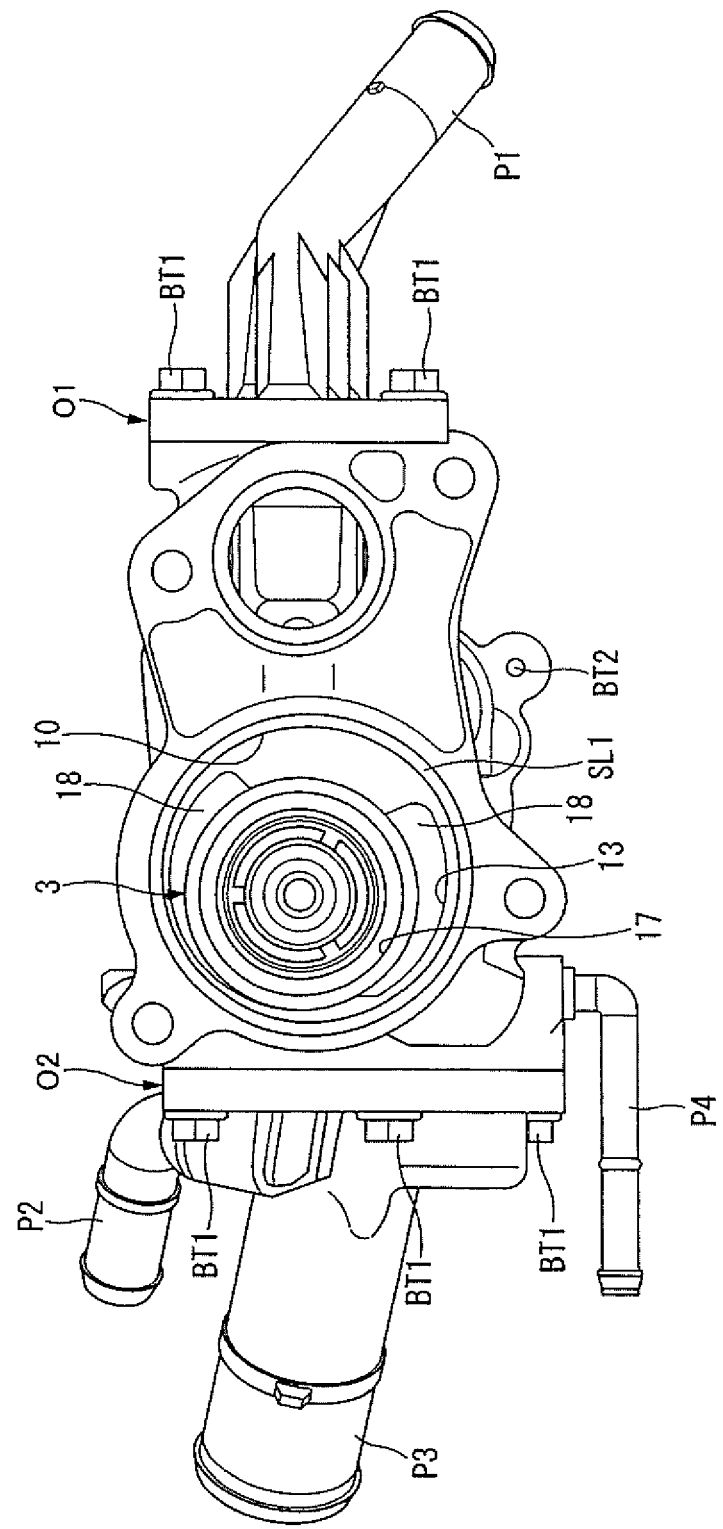
FIG. 8 is a drawing of the flow rate control valve viewed from C-direction of FIG. 5.

The valve body accommodating portion 13 communicates with an engine inside (not shown) through an introduction port (an introduction opening) 10 having a stepped widening-diameter at the one end side in the axial direction, then the cooling water from the engine inside is introduced into the valve body accommodating portion 13. Here, in the present invention, as shown in FIG. 8, the introduction opening 10 does not indicate the one end side opening of the valve body accommodating portion 13, but indicates an opening of the first flange portion 11a that is connected to the engine inside. That is, at the axial direction one end side of the valve body accommodating portion 13, the introduction opening 10 opens toward the engine inside by a maximum diameter of the introduction opening 10, and the valve body accommodating portion 13 is formed such that a cross section of the opening is reduced stepwise from the introduction opening 10.

Then, by the fact that the valve body 3 is disposed and accommodated in the valve body accommodating portion 13, an inner peripheral side passage 17 which is formed at an inner peripheral side of the valve body 3 and forms a main flow and an outer peripheral side passage 18, as a bypass passage according to the present invention, which is formed at an outer peripheral side of the valve body 3 and forms a bypass flow that is a different flow from the main flow are defined in the valve body accommodating portion 13. That is, the cooling water introduced from the introduction opening 10 directly flows into the inner peripheral side passage 17 and the outer peripheral side passage 18 from this introduction opening 10, and divided cooling water is exhausted while merging with each other at after-mentioned each of exhaust ports E1 to E3 through the inner peripheral side passage 17 and the outer peripheral side passage 18.

Here, the flow rate control valve CV is configured such that a cross section (an F-F cross section in FIG. 4) of an opening including the introduction opening 10, the inner peripheral side passage 17 and the outer peripheral side passage 18 from the introduction opening 10 to at least an after-mentioned one exhaust port (in the present embodiment, the third exhaust port E3) is reduced stepwise in the axial direction of the valve body accommodating portion 13.

Further, an opening cross section of each of the exhaust ports E1 to E3 is formed so as to be smaller than the opening cross section of the introduction opening 10. That is, the cross section from the introduction opening 10 to each of the exhaust ports E1 to E3 is largest at the introduction opening 10, and is smallest at each of the exhaust ports E1 to E3.

On a peripheral wall of the valve body accommodating portion 13, a plurality of substantially cylindrical first to third exhaust ports E1 to E3 to exhaust the cooling water by connecting to the respective first to third pipes L1 to L3 (see FIG. 1) are formed by radially penetrating the peripheral wall of the valve body accommodating portion 13 at predetermined circumferential direction positions. The middle diameter first exhaust port E1 communicating with the heater heat exchanger HT and the small diameter exhaust port E2 communicating with the oil cooler OC, from among the first to third exhaust ports E1 to E3, are arranged so as to overlap with each other in the axial direction of the valve body accommodating portion 13 (so as to substantially face each other in a radial direction). In addition, the small diameter second exhaust port E2 communicating with the oil cooler OC and the large diameter third exhaust port E3 communicating with the radiator RD are arranged parallel to each other in the axial direction of the valve body accommodating portion 13 so as to be adjacent to each other. The first and second exhaust ports E1 and E2 are positioned at the introduction opening 10 side, and the third exhaust port E3 is positioned at the end wall 11$b$ side.

Figure 3:
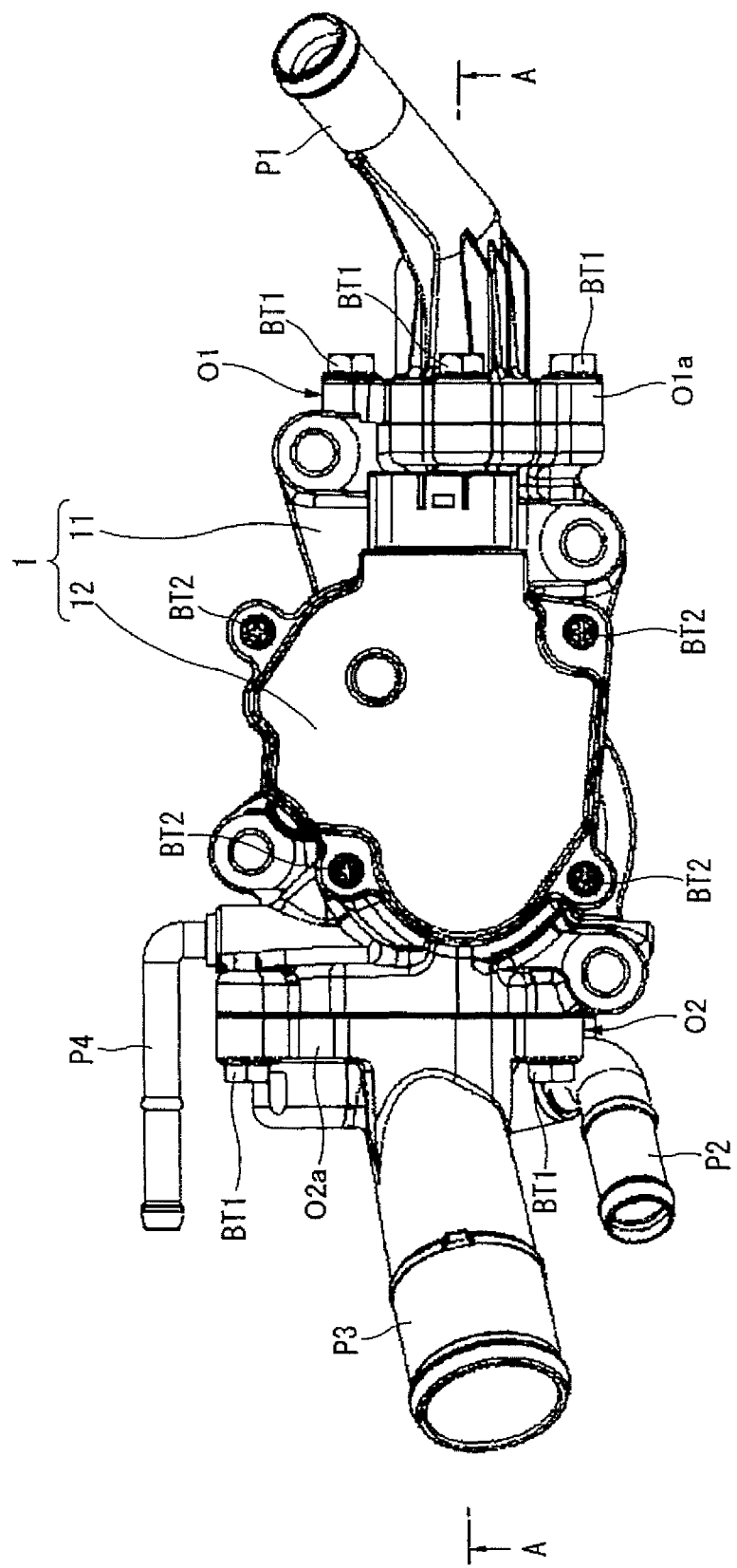
FIG. 3 is a plan view of the flow rate control valve shown in FIG. 2.

Here, as shown in FIG. 3, the first to third exhaust ports E1 to E3 are connected to the first to third pipes L1 to L3 (see FIG. 1) through after-mentioned first to third exhaust pipes P1 to P3 respectively. That is, a first outlet O1 that forms the first exhaust pipe P1 and a second outlet O2 that forms the second and third exhaust pipes P2 and P3 are fixed to one side and the other side in the radial direction of an outer peripheral portion of the valve body accommodating portion 13 respectively with a plurality of bolts.

The first outlet O1 is formed as a single-piece component by integrally molding a flange O1$a$ that connects to an outer end side opening edge of the first exhaust port E1 which is the outer peripheral portion of the valve body accommodating portion 13 and the first exhaust pipe P1 that protrudes from an outer side portion of the flange O1$a$ and leads the cooling water discharged from the first exhaust port E1 to the first pipe L1.

Figure 5:
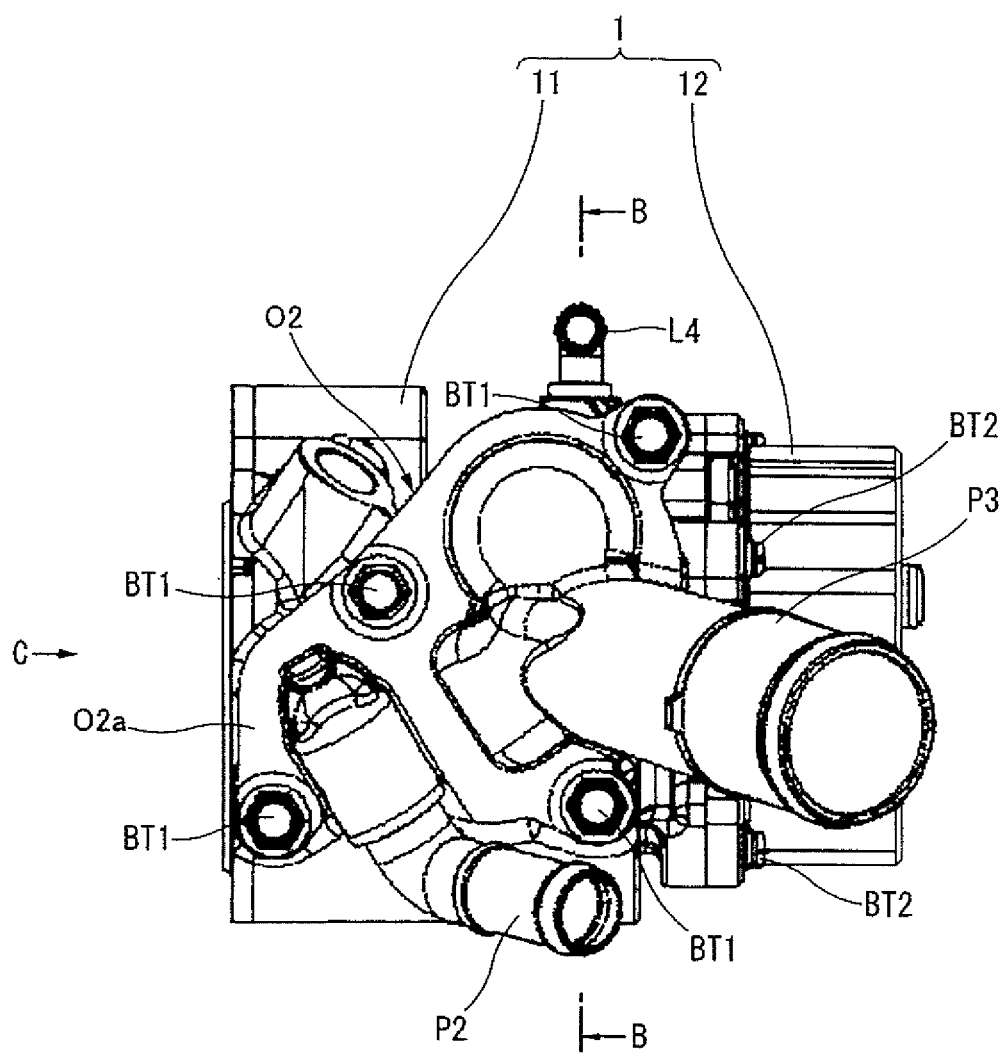
FIG. 5 is a side view of the flow rate control valve shown in FIG. 3.

The second outlet O2 is formed, as shown in FIGS. 3 and 5, as a single-piece component by integrally molding a flange O2$a$ that connects to outer end side opening edges of the second and third exhaust ports E2 and E3 which are the outer peripheral portions of the valve body accommodating portion 13 and the second and third exhaust pipes P2 and P3 that protrude from an outer side portion of the flange O2$a$ and lead the cooling water discharged from the second and third exhaust ports E2 and E3 to the second and third pipes L2 and L3.

Seal units that liquid-tightly seal respective gaps between the first to third exhaust ports E1 to E3 and the valve body 3 when closing the first to third exhaust ports E1 to E3 are provided at inner circumferential sides of the first to third exhaust ports E1 to E3. The seal units are formed from substantially tubular first to third seal members S1 to S3 that are accommodated movably forward and backward at inner end sides of the exhaust ports E1 to E3 and seal the gaps between the first to third exhaust ports E1 to E3 and the valve body 3 by sliding-contacting an outer peripheral surface of the valve body 3, first to third coil springs SP1 to SP3 that are elastically interposed between opening edges of the first to third exhaust pipes P1 to P3 and inner side end surfaces of the first to third seal members S1 to S3 at outer end sides of the exhaust ports E1 to E3 with a predetermined pre-load provided while being seated on the opening edges (regarding the first exhaust pipe P1, on a retainer member 16) of the first to third exhaust pipes P1 to P3 and force the first to third seal members S1 to S3 to the valve body 3 side, and well-known O-rings SL2 that are interposed between inner circumferential surfaces of the exhaust ports E1 to E3 and outer circumferential surfaces of the seal members S1 to S3 with the O-rings SL2 fitted in respective depressed portions formed on the inner circumferential surfaces of the exhaust ports E1 to E3 and seal gaps between the exhaust ports E1 to E3 and the seal members S1 to S3 by sliding-contacting the outer circumferential surfaces of the seal members S1 to S3.

The first to third seal members S1 to S3 are provided, at inner circumferential edges at one end sides thereof which are the valve body 3 side, with cone-shaped tapered first to third valve body sliding portions S1$a$ to S3$a$ that make sliding-contact with after-mentioned first to third sliding portions (sliding surfaces) D1 to D3. Further, the first to third seal members S1 to S3 are provided, at the other end sides thereof, with flat first to third seating surfaces S1$b$ to S3$b$ on which one end sides of the first to third coil springs SP1 to SP3 are seated. With this structure, the first to third seal members S1 to S3 are configured such that only middle portions in a thickness width direction (in a radial direction) of the first to third valve body sliding portions S1$a$ to S3$a$ sliding-contact the sliding surfaces D1 to D3 by so-called line-contact.

Figure 6:
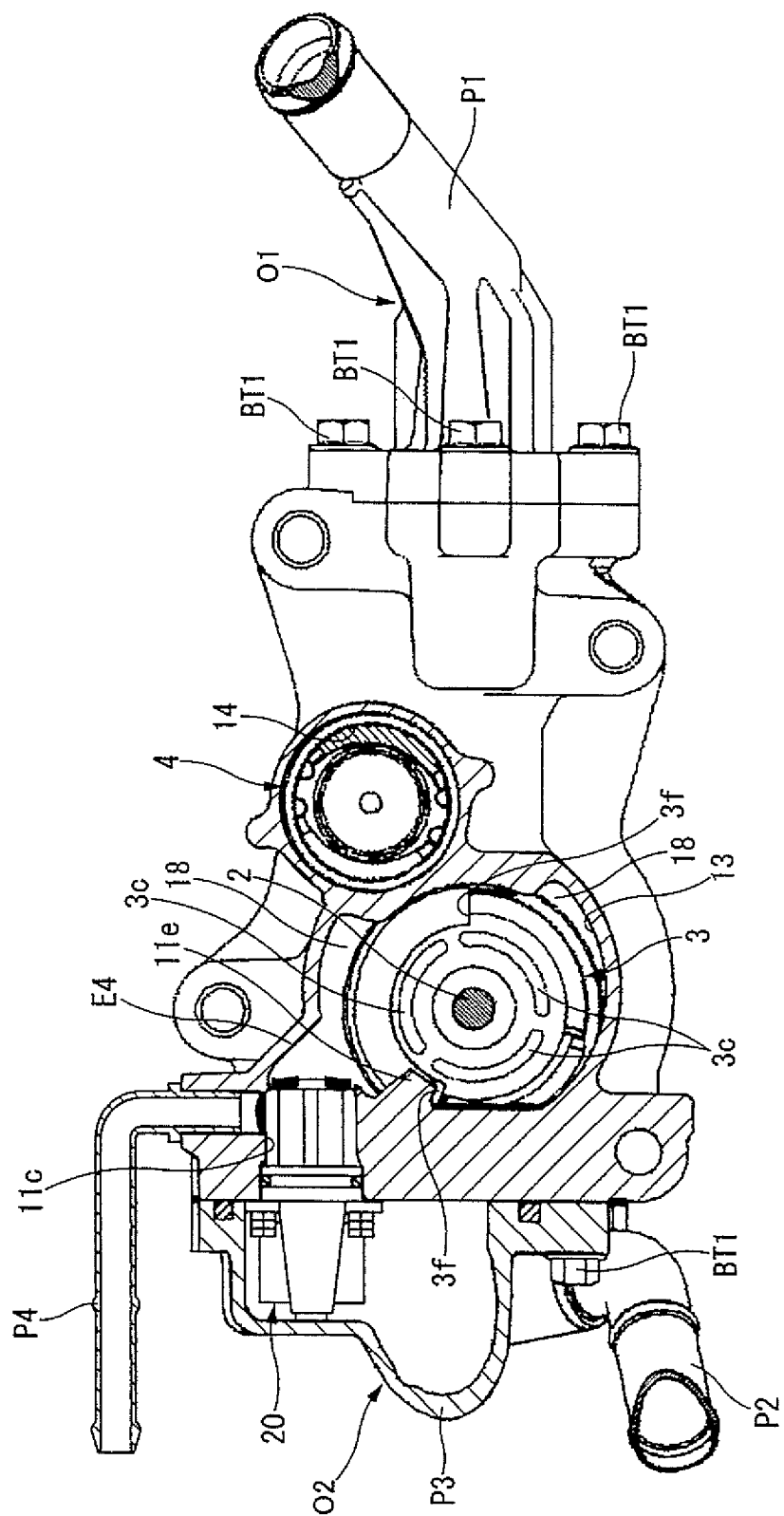
FIG. 6 is a sectional view taken along a line B-B of FIG. 5.

Further, as shown in FIGS. 5 and 6, a fourth exhaust port E4 whose inner end side faces to the outer peripheral side passage 18 and whose outer end side is connected to a fourth exhaust pipe P4 for leading the cooling water to the throttle chamber TC is formed at the other end side of the valve body accommodating portion 13. The bypass passage BL (see FIG. 1) is formed by this configuration. That is, with this configuration, the cooling water introduced to the outer peripheral side passage 18 is always exhausted from the fourth exhaust pipe P4 regardless of an after-mentioned rotation phase of the valve body 3, and can be distributed to the throttle chamber TC through a fourth pipe L4 (see FIG. 1).

Figure 7A:
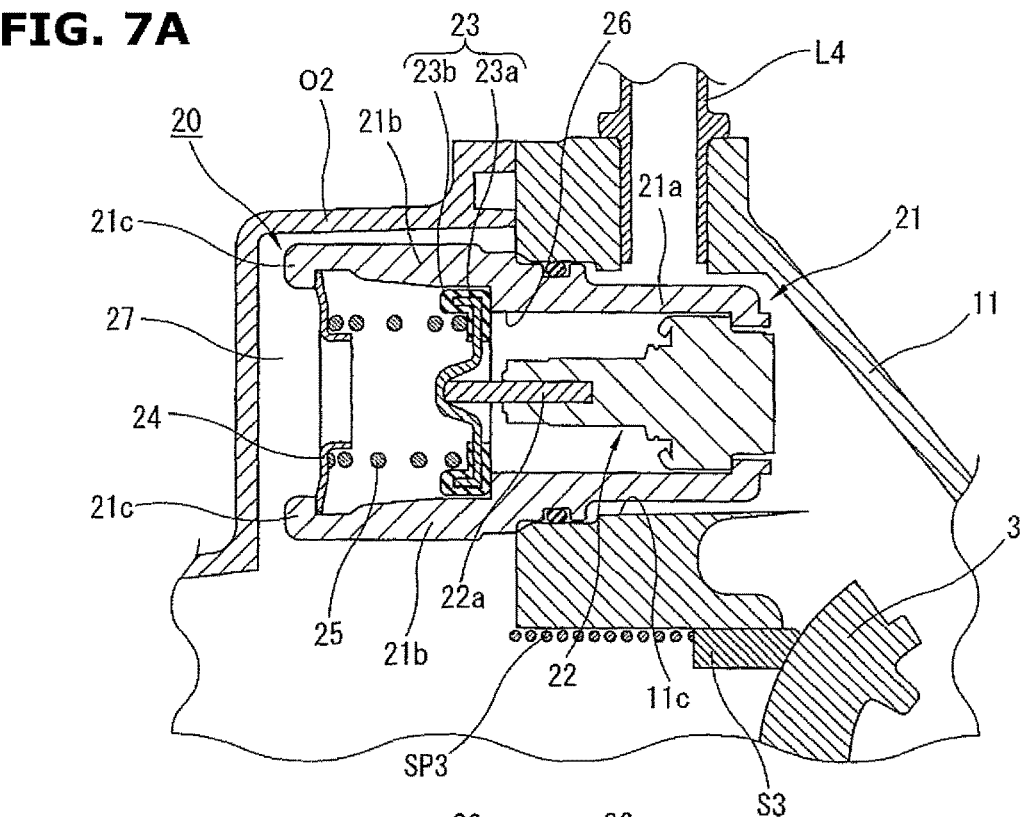
FIGS. 7A and 7B are longitudinal cross sections of a fail-safe valve shown in FIG. 2.
Figure 7B:
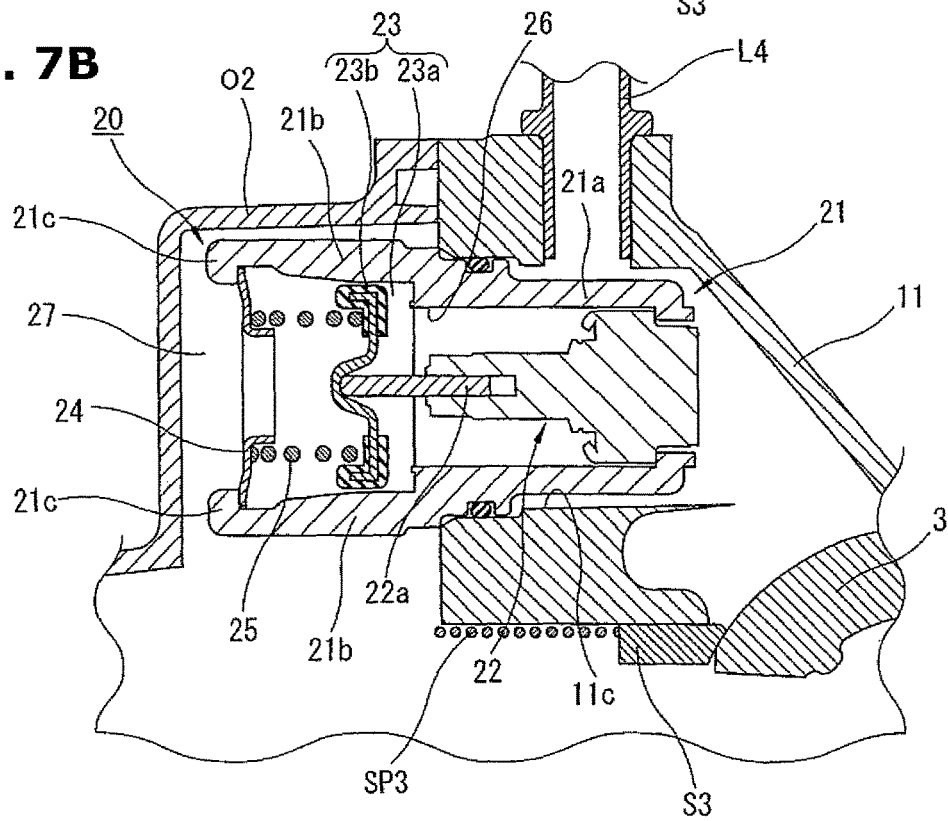

Furthermore, as shown in FIGS. 2, 6 and 7, a fail-safe valve 20 that allows communication between the valve body accommodating portion 13 (the outer peripheral side passage 18) and the third exhaust port E3 during emergency in which the valve body 3 is inoperable, such as electric system failure, is provided at a side portion of the third exhaust port E3. With this, even when the valve body 3 is inoperable, supply of the cooling water to the radiator RD is secured, and overheat of the engine EG can be prevented.

The fail-safe valve 20 is formed mainly by a valve body 21 as a substantially tubular flow passage forming member which is inserted and fitted into a penetration hole 11c formed on the peripheral wall of the valve body accommodating portion 13 and forms a communication passage 26 that is a flow passage connecting the outer peripheral side passage 18 and the third exhaust pipe P3 (an after-mentioned exhaust chamber 27) at an inner peripheral side of the valve body 21, a thermo-element 22 accommodated at an inner end side of the valve body 21 and configured such that when a temperature of the cooling water exceeds a predetermined temperature, wax (not shown) filled in the thermo-element 22 expands then a rod 22a moves to a valve opening direction, a valve member 23 fixed to the rod 22a of the thermo-element 22 and opening and closing the communication passage 26, a substantially disk-shaped retainer member 24 supported at an outer end portion (supporting parts 21c of after-mentioned arm portions 21b) of the valve body 21 with the retainer member 24 facing to the valve member 23, and a coil spring 25 elastically interposed between the retainer member 24 and the valve member 23 with a predetermined pre-load provided and forcing the valve member 23 to a valve closing direction.

The valve body 21 has a small diameter body 21a having a substantially stepped diameter shape and accommodating and holding the thermo-element 22, and the plurality of arm portions 21b formed at and protruding from predetermined circumferential direction positions at an outer end side of the body 21a and supporting the retainer member 24. Then, the supporting part 21c having a nail shape is formed at a tip end of each arm portion 21b so as to be bent in a radially inner side, and supports the retainer member 24.

The valve member 23 has a core metal 23a fixed to the rod 22a of the thermo-element 22 and a rubber covering 23b formed so as to cover an outer peripheral portion of the core metal 23a to increase liquid-tightness between the valve member 23 and the valve body 21 at a valve closing. The covering 23b of the valve member 23 is seated on and separates from an outer opening edge of the body 21a, then the communication passage 26 is closed and opened.

In this manner, in a normal state (when the temperature of the cooling water is lower than the predetermined temperature), the covering 23b of the valve member 23 is press-fitted onto the outer opening edge (an outer hole edge) of the communication passage 26 by a spring force of the coil spring 25, then a valve closing state is maintained. On the other hand, in a high temperature state (when the temperature of the cooling water is the predetermined temperature or higher), the wax in the thermo-element 22 expands and the valve member 23 moves backward to the outer end side of the valve body 21 together with the rod 22a against the spring force of the coil spring 25, then the fail-safe valve 20 opens. With this valve opening, the communication passage 26 communicates with an inflow hole (not shown), and the cooling water introduced to the outer peripheral side passage 18 is exhausted from the third exhaust pipe P3, and is supplied to the radiator RD through the third pipe L3 (see FIG. 1).

Here, besides temperature increase of the cooling water, also in a case where a pressure of the cooling water exceeds a predetermined pressure, the valve member 23 moves backward against the spring force of the coil spring 25, and the communication passage 26 communicates with the inflow hole (not shown). With this communication, an internal pressure of the flow rate control valve CV is decreased, thereby preventing failure of the flow rate control valve CV.

As shown in FIGS. 2 and 10, the second housing 12 formed into a recessed shape that opens such that one end side of the second housing 12, which faces the first housing 11, covers the both valve body accommodating portion 13 and motor accommodating portion 14. The second housing 12 is fixed to the other end side of the first housing 11 through a second flange portion 12a formed at an outer circumferential area of one end side opening of the second housing 12 with a plurality of bolts BT2. With this structure, a speed reduction mechanism accommodating portion 15 accommodating therein the speed reduction mechanism 5 is formed between the second housing 12 and the other end side of the first housing 11. Here, when connecting the first housing 11 and the second housing 12, by inserting a ring-shaped seal member SL3 into a connecting surface between these housings 11 and 12, liquid tightness of the speed reduction mechanism accommodating portion 15 is ensured.

The rotation shaft 2 is rotatably supported by the bearing B1 accommodated in a shaft insertion hole 11d formed at the end wall 11b corresponding to other end wall of the valve body accommodating portion 13. One end in the axial direction of the rotation shaft 2 is fixed to the valve body 3 so as to integrally rotate with each other, and the other end in the axial direction of the rotation shaft 2 is fixed to an after-mentioned second helical gear HG2 so as to integrally rotate with each other. A ring-shaped seal member SL4 is inserted between an outer peripheral surface of the rotation shaft 2 and an inner end side opening edge of the shaft insertion hole 11d, thereby suppressing inflow of the cooling water to the speed reduction mechanism accommodating portion 15 from the valve body accommodating portion 13 side through a radial direction gap between the shaft insertion hole 11d and the rotation shaft 2.

Figure 4:
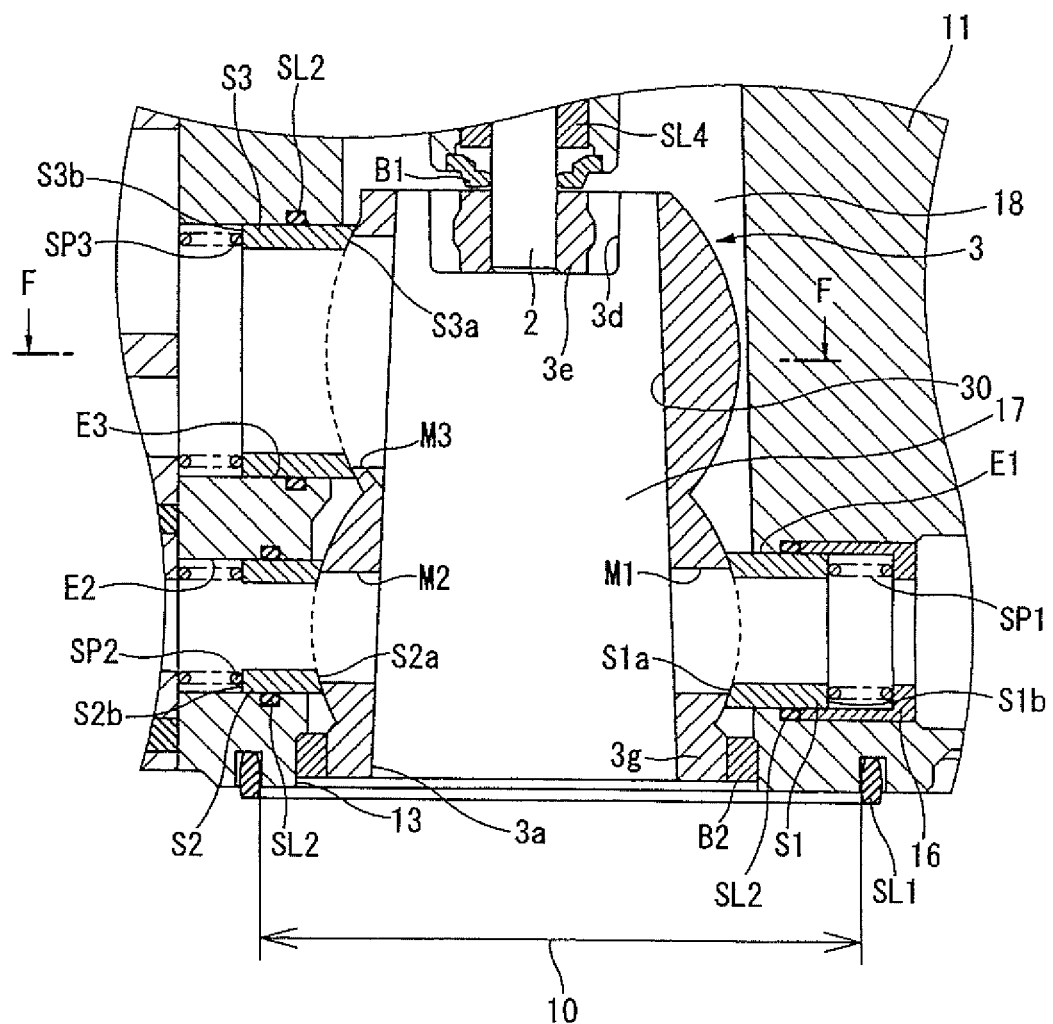
FIG. 4 is a sectional view taken along a line A-A of FIG. 3.

The valve body 3 is formed as a single-piece component with certain synthetic resin material. As shown in FIGS. 4 and 11, an axial direction one end side of the valve body 3 is open as an inflow port 3a through which the cooling water introduced from the introduction opening 10 of the first housing 11 flows into the inner peripheral side passage 17. Here, especially as shown in FIG. 4, this valve body 3 is formed such that an inside diameter of the valve body 3 is gradually reduced from the axial direction one end side toward the other end side, and a flow passage sectional area of the inner peripheral side passage 17 is gradually reduced from the inflow port 3a toward a third opening portion M3. More specifically, by providing a tapered portion 30 having such cone tapered shape that a diameter of an inner peripheral surface of the valve body 3 is gradually reduced toward the other side of the valve body 3, the reduced flow passage sectional area of the inner peripheral side passage 17 is realized.

Figure 14:
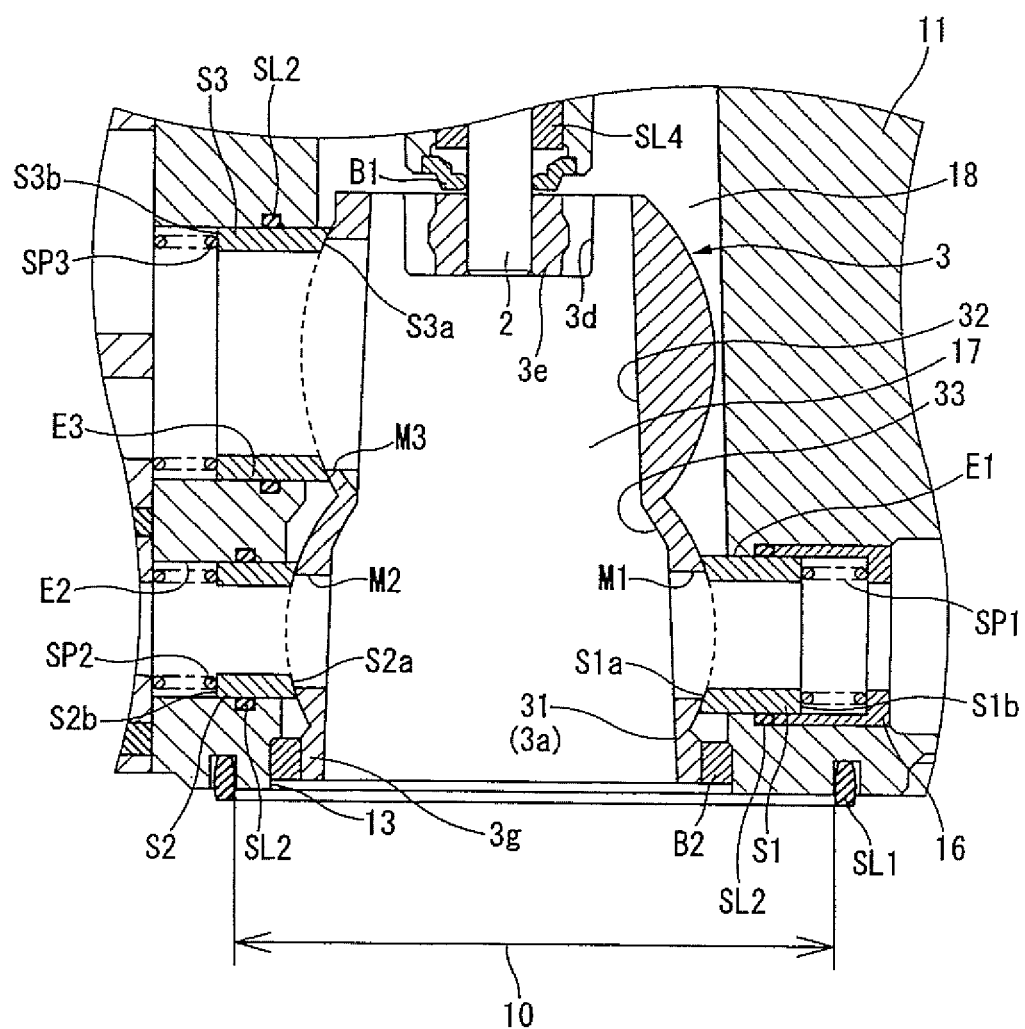
FIG. 14 is a sectional view of a main part, corresponding to a tapered portion of FIG. 4, of the flow rate control valve according to a first other example.
Figure 15:
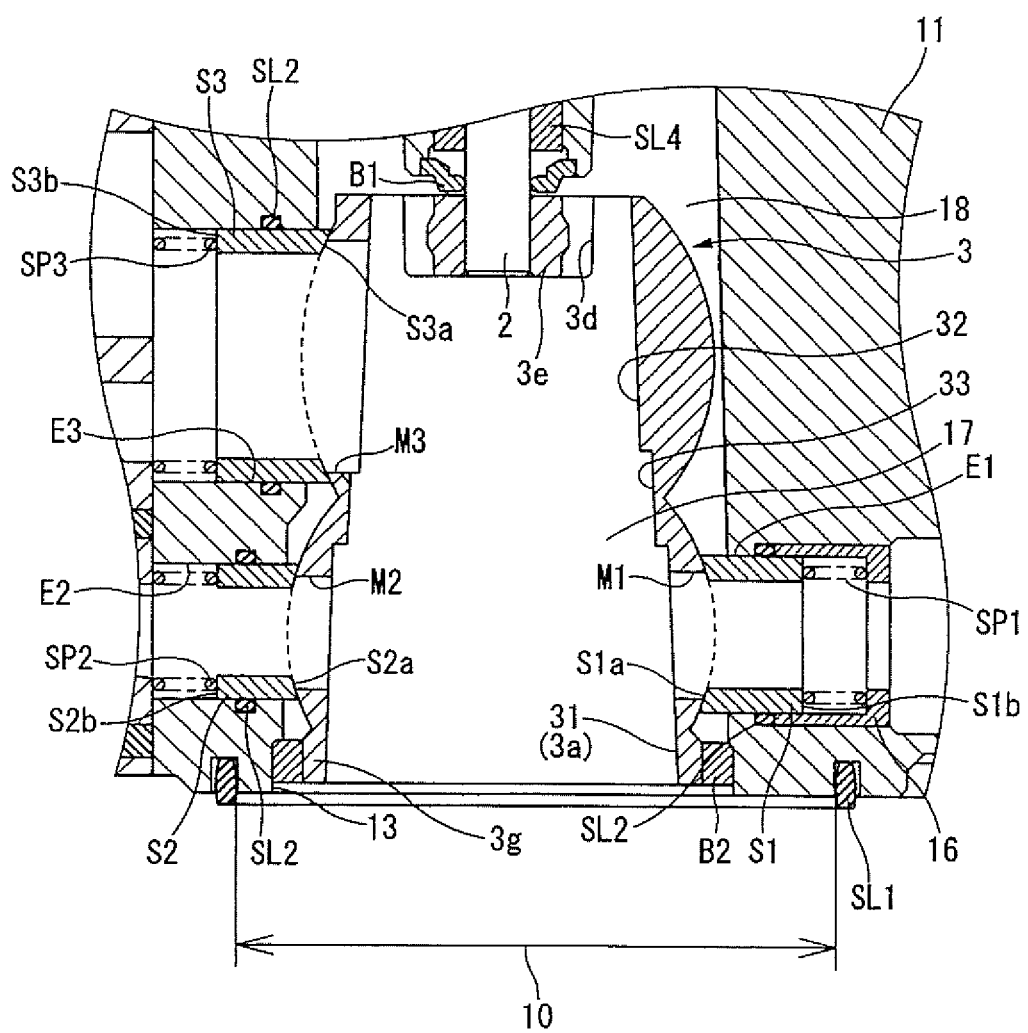
FIG. 15 is a sectional view of a main part, corresponding to the tapered portion of FIG. 4, of the flow rate control valve according to a second other example.

Regarding the reduction of the inside diameter of the valve body 3, besides the tapered portion 30 as shown in FIG. 4, for instance, as shown in FIGS. 14 and 15, the inside diameter of the valve body 3 could be reduced by a plurality of tapered portions such as first to third tapered portions 31 to 33. More specifically, inner peripheral surfaces of the valve body 3 corresponding to after-mentioned first and second axial direction sections X1 and X2 are the first and second tapered portions 31 and 32, and a joining part of these tapered portions 31 and 32 is the third tapered portion 33. Then, the inside diameter of the valve body 3 is gradually reduced such that each inside diameter of the tapered portions 31 to 33 is gradually reduced from the first tapered portion 31 to the third tapered portion 33 and from the third tapered portion 33 to the second tapered portion 32.

With regard to the joining of the first tapered portion 31 and the second tapered portion 32, as shown in FIG. 14, the first tapered portion 31 and the second tapered portion 32 could be smoothly joined only by or through the third tapered portion 33 with an inclination of the third tapered portion 33 being great with respect to the first and second tapered portions 31 and 32. Further, as shown in FIG. 15, the first to third tapered portions 31 to 33 could be joined stepwise with each inclination of the first to third tapered portions 31 to 33 being substantially the same. In other words, the number of the tapered portions and the joining of the tapered portions could be arbitrarily set according to specifications and cost of the flow rate control valve CV.

As described above, by providing an inside diameter reduction structure by the first to third tapered portions 31 to 33, a reduction ratio of the flow passage sectional area of the inner peripheral side passage 17 is lowered, then a reduction amount of flow passage sectional area can be smoother. Further, an entire thickness (a radial direction width) of the valve body 3 can be reduced by each of the tapered portions 31 to 33, thereby having merits such as increase in rotation performance of the valve body 3 and increase in flow amount of the cooling water.

On the other hand, the other end side of the valve body 3 is closed with an end wall 3b. The end wall 3b is provided with a plurality of substantially arc-shaped communication ports 3c along a circumferential direction which allow communication between the inner peripheral side passage 17 and the outer peripheral side passage 18. Here, a bypass hole according to the present invention is formed also by each communication port 3c together with an after-mentioned auxiliary intake port M4. At a middle portion of the end wall 3b which corresponds to an axial center of the valve body 3, a substantially tubular shaft fixing portion 3d for fixing to the rotation shaft 2 is formed along the axial direction. Further, a metal-made insert member 3e is fixedly connected to an inner peripheral side of the shaft fixing portion 3d, and the valve body 3 is press-fixed to the rotation shaft 2 through the insert member 3e.

An outside shape of the valve body 3 is a ball-connecting-shape formed by connecting, in series in the axial direction, substantially spherical seal sliding portions (the first to third seal sliding portions D1 to D3 described later) that perform a sealing function at the valve closing by making sliding-contact with the respective seal members S1 to S3. By rotation of the valve body 3 within a predetermined angle range of substantially 180° in the circumferential direction, opening and closing of each of the exhaust ports E1 to E3 are performed. Regarding the rotation of the valve body 3, the valve body 3 is rotatably supported by a bearing B2 fitted in and held by the one end side of the valve body accommodating portion 13 through a bearing portion 3g having a large diameter shape at the one end side of the valve body accommodating portion 13.

Here, in connection with forming of the seal sliding portions D1 to D3, the valve body 3 is broadly divided into two axial direction sections of the first axial direction section X1 at the one end side and the second axial direction section X2 at the other end side. These first and second axial direction sections X1 and X2 are substantially equally defined with a middle position in the axial direction of the valve body 3 being a border. Then, at least after-mentioned opening portions M1 to M3 are formed such that longitudinal sections of edges of the opening portions M1 to M3 are substantially spherical, i.e. curved surfaces having substantially the same curvature in the first and second axial direction sections X1 and X2, and the curvature is the same as a rotation radius of the valve body 3.

Figure 12A:
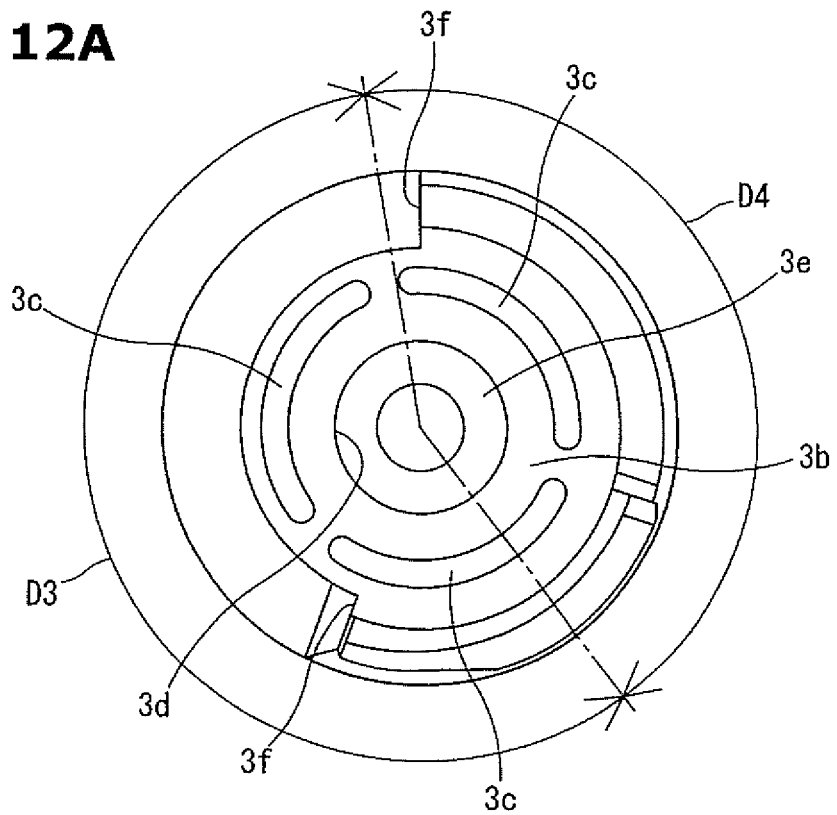
FIG. 12A is a drawing of the valve body, viewed from D-direction of FIG. 11A.
Figure 12B:
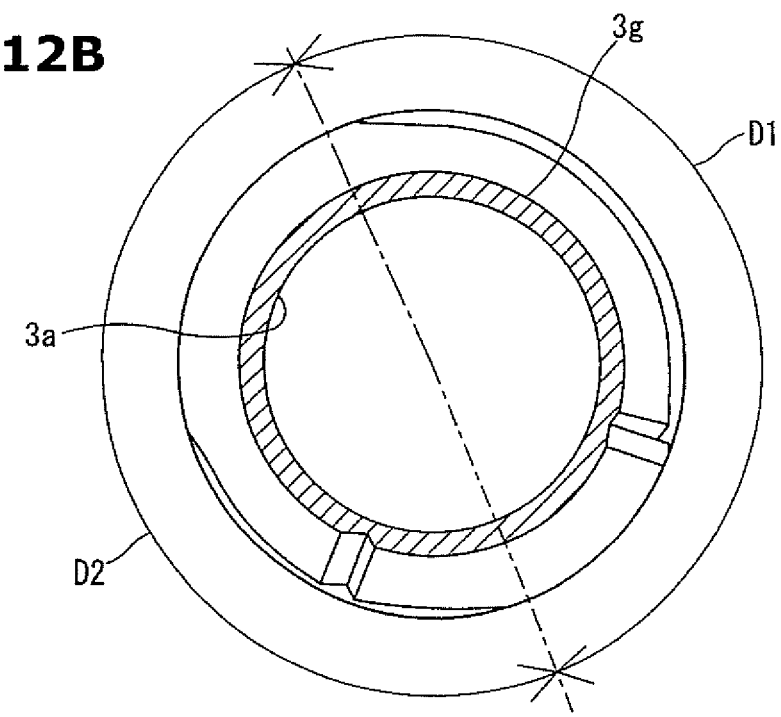
FIG. 12B is a sectional view taken along a line E-E of FIG. 11A.

As shown in FIG. 12B, the first axial direction section X1 is formed by the first seal sliding portion D1 extending throughout substantially half circumference and making sliding-contact with the first seal member S1 and the second seal sliding portion D2 extending throughout substantially remaining half circumference and making sliding-contact with the second seal member S2. On the first seal sliding portion D1, the long-hole-shaped first opening portion M1 that is set to an axial direction width so as to overlap with the first exhaust port E1 without excess and deficiency is formed along the circumferential direction. Likewise, on the second seal sliding portion D2, the long-hole-shaped second opening portion M2 that is set to an axial direction width so as to overlap with the second exhaust port E2 without excess and deficiency is formed along the circumferential direction.

In this manner, in the valve body 3 according to the present invention, since the first opening portion M1 and the second opening portion M2 provided at different circumferential direction positions overlap with each other in a rotation axis direction of the valve body 3 in the first axial direction section X1, reduction in size in the axial direction of the valve body 3 is achieved.

As shown in FIG. 12A, the second axial direction section X2 is formed by the third seal sliding portion D3 extending over the half circumference and making sliding-contact with the third seal member S3 and a non-seal sliding portion D4 extending throughout the remaining circumferential direction area and having no sealing function by the third seal member S3 without facing the third seal member S3. On the third seal sliding portion D3, the long-hole-shaped third opening portion M3 that is set to an axial direction width so as to overlap with the third exhaust port E3 without excess and deficiency is formed along the circumferential direction.

Figure 9:
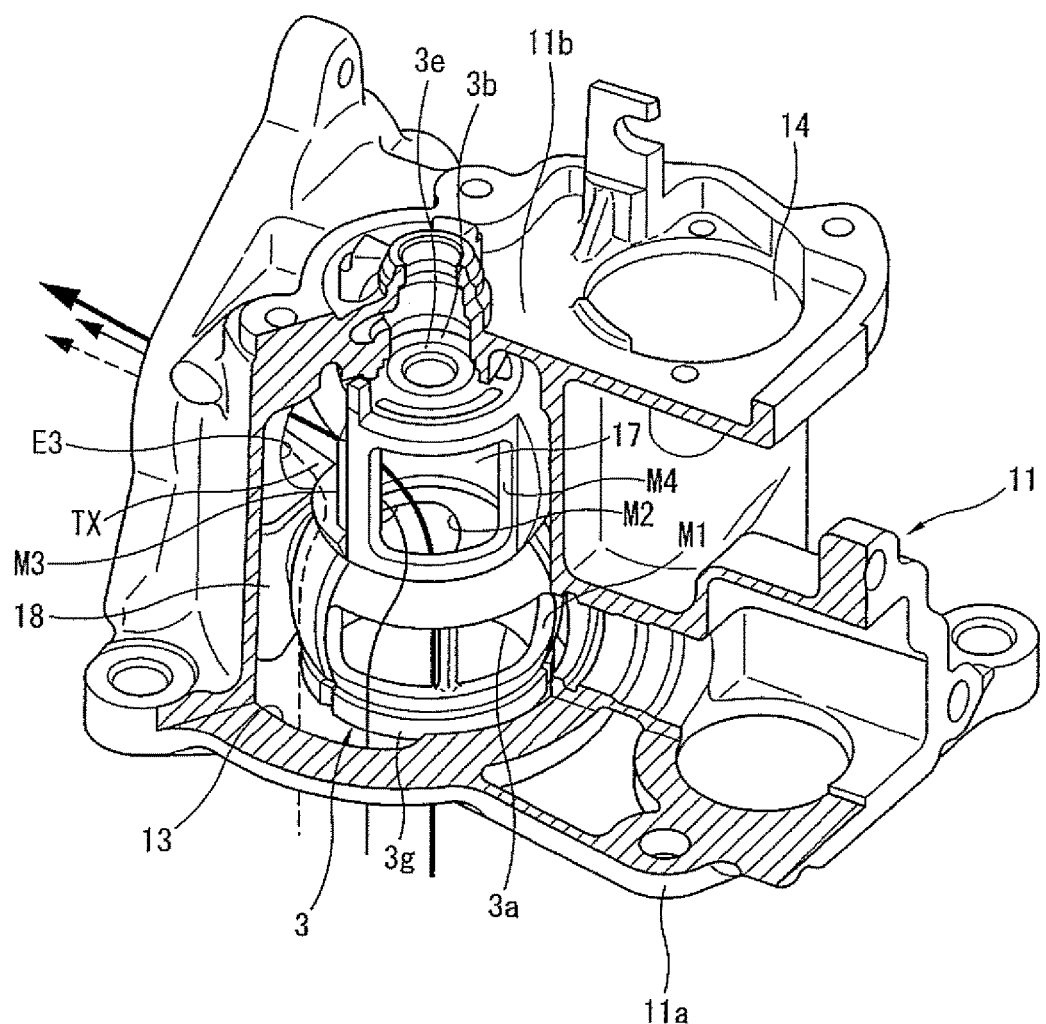
FIG. 9 is a partial cross section of the flow rate control valve shown in FIG. 2.

The third opening portion M3 is configured such that, since the third opening portion M3 is shaped into the long hole along the circumferential direction as shown in FIGS. 11A to 11D, when the third opening portion M3 overlaps with the third exhaust port E3, i.e. when the third exhaust port E3 opens, as shown in FIG. 9, the cooling water of the inner peripheral side passage 17 (including the cooling water flowing into the inner peripheral side passage 17 from the outer peripheral side passage 18 through the after-mentioned auxiliary intake port M4 etc.) flows into the third exhaust port E3 through the third opening portion M3, and the cooling water of the outer peripheral side passage 18 directly flows into the third exhaust port E3 through an opening (hereinafter, called a direct communicating portion) TX that faces the outer peripheral side passage 18 at a circumferential direction end portion side. On the other hand, when the third exhaust port E3 is closed, as a consequence of the closure of the third exhaust port E3 by a circumferential direction area of the third seal sliding portion D3 except the third opening portion M3, not only the cooling water from the inner peripheral side passage 17, but also the cooling water from the outer peripheral side passage 18 side through the direct communicating portion TX, are shut off at once.

The non-seal sliding portion D4 is provided, as shown in FIGS. 11A to 11D, with the auxiliary intake port M4, as a bypass passage according to the present invention, whose plan view is a substantially rectangular and which extends in the circumferential direction. As shown in FIG. 9, this auxiliary intake port M4 serves to introduce the cooling water flowing in the outer peripheral side passage 18 into the inner peripheral side passage 17 then join the bypass flow flowing in the outer peripheral side passage 18 with the main flow flowing in the inner peripheral side passage 17. The non-seal sliding portion D4 is a so-called unused area. Unlike the first to third seal sliding portions D1 to D3 formed into the substantially spherical shape, the non-seal sliding portion D4 is formed into a flat shape that is non-spherical shape. Therefore, reduction in weight of the valve body 3 and improvement in yield of material forming the valve body 3 are achieved.

Shape and circumferential direction position of each of the first to third opening portions M1 to M3 formed as described above are set such that, as shown in FIGS. 13A to 13D, a communication state with the first to third exhaust ports E1 to E3 is changed in order of first to fourth states by and according to the rotation of the valve body 3.

The third seal sliding portion D3 located at the other end portion of the valve body 3 is provided with a pair of contact portions 3f, 3f for restricting the rotation of the valve body 3. As shown in FIGS. 6, 11A to 11D and 12A and 12B, these contact portions 3f, 3f are formed so as to be able to contact a rotation restricting portion 11e that is formed at the peripheral wall at the other end side of the valve body accommodating portion 13. The contact portions 3f, 3f contact the rotation restricting portion 11e, thereby limiting a rotation range of the valve body 3 to within the predetermined angle range. Since these contact portions 3f, 3f are necessarily provided, by using the contact portions 3f, 3f, no special stopper is required for restricting the rotation of the valve body 3, and this reduces cost of the flow rate control valve CV.

As shown in FIGS. 2 and 10, the electric motor 4 is secured to an opening edge of the motor accommodating portion 14 through a flange portion 4b formed at a base end portion of a motor body 4a with a plurality of bolts BT3 with the motor body 4a accommodated in the motor accommodating portion 14 of the first housing 11. The motor output shaft 4c of the electric motor 4 extends in the speed reduction mechanism accommodating portion 15 of the second housing 12 through one end side opening of the motor accommodating portion 14. This electric motor 4 is controlled by a vehicle-mounted electronic controller (not shown), and controls the rotation of the valve body 3 according to a vehicle operating condition, then a proper distribution of the cooling water to the radiator RD is realized.

The speed reduction mechanism 5 is a drive mechanism formed by two worm gears. The speed reduction mechanism 5 has a first worm gear G1 that connects to the motor output shaft 4c and reduces a rotation speed of the electric motor 4 and a second worm gear G2 that engages with the first worm gear G1 and further reduces the rotation speed of the electric motor 4, which is transmitted through the first worm gear G1, and transmits the rotation to the rotation shaft 2. The second worm gear G2 is disposed in a substantially orthogonal direction to the first worm gear G1.

The first worm gear G1 is formed by a first crossed helical gear (a first screw gear) WG1 fixedly connected to an outer periphery of the motor output shaft 4c and rotating integrally with the motor output shaft 4c and a first helical gear HG1 fixedly connected to one end side outer periphery of a rotation shaft 19 arranged in an orthogonal direction to the first screw gear WG1 that is substantially parallel to the motor output shaft 4c and outputting rotation of the first screw gear WG1 with a rotation speed of the first screw gear WG1 reduced by engaging with the first screw gear WG1. The first screw gear WG1 is formed by a single thread, and the first helical gear HG1 is formed by 14-teeth gear, then a reduction gear ratio of the first worm gear G1 is set to ¹⁄₁₄.

The second worm gear G2 is formed by a second crossed helical gear (a second screw gear) WG2 fixedly connected to the other end side outer periphery of the rotation shaft 19 and rotating integrally with the first helical gear HG1 and the second helical gear HG2 fixed to the other end side outer periphery of the rotation shaft 2 so as to rotate integrally with the rotation shaft 2 that is disposed in an orthogonal direction to the second screw gear WG2 and outputting rotation of the second screw gear WG2 with a rotation speed of the second screw gear WG2 reduced by engaging with the second screw gear WG2. Similar to the first worm gear G1, the second screw gear WG2 is formed by a single thread, and the second helical gear HG2 is formed by 14-teeth gear, then a reduction gear ratio of the second worm gear G2 is set to ¹⁄₁₄.

In the following description, specific working state of the flow rate control valve CV will be explained. In the explanation, in FIGS. 13A to 13D, for convenience, to distinguish between the exhaust ports E1 to E3 and the opening portions M1 to M3, the first to third opening portions M1 to M3 of the valve body 3 are shown by broken lines, and the first to third exhaust ports E1 to E3 of the first housing 11 are shown by hatch patterns. Further, a state in which these opening portions M1 to M3 and exhaust ports E1 to E3 overlap and communicate with each other is shown by a solid filled pattern.

A rotation position (a phase) of the valve body 3 of the flow rate control valve CV is controlled such that a relationship between the exhaust ports E1 to E3 and the opening portions M1 to M3 is the following states according to the vehicle operating condition by drive control of the electric motor 4 by a control current calculated by and outputted from the electronic controller (not shown) according to the vehicle operating condition.

Figure 13A:
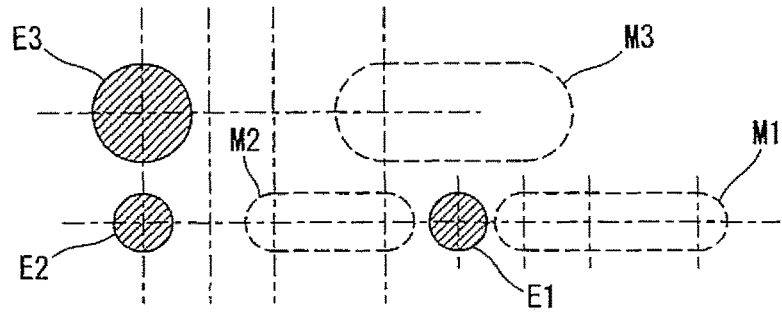
FIGS. 13A to 13D are drawings for explaining operating states of the flow rate control valve of the present invention.

In a first state shown in FIG. 13A, all the first to third opening portions M1 to M3 are in a non-communication state in which the opening portions M1 to M3 do not communicate with the exhaust ports E1 to E3 respectively. With this, in the first state, the cooling water is not supplied to any of the heater heat exchanger HT, the oil cooler OC and the radiator RD.

Figure 13B:
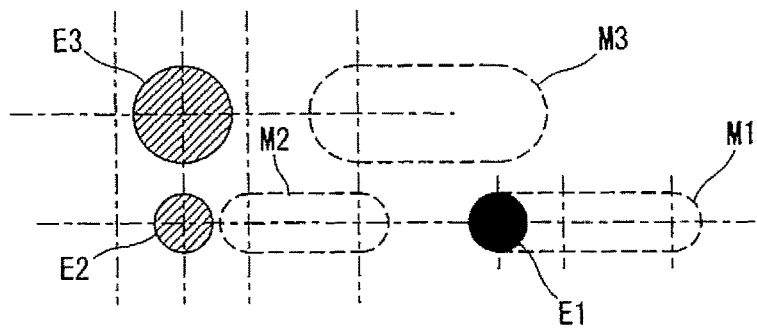

In a second state shown in FIG. 13B after the first state, only the first opening portion M1 is in a communication state, and the second and third opening portions M2 and M3 are in the non-communication state. With this, in the second state, by this communication state, the cooling water is supplied to only the heater heat exchanger HT from the first exhaust port E1 through the first pipe L1, and its supply amount is changed according to an overlap amount between the first exhaust port E1 and the first opening portion M1.

Figure 13C:
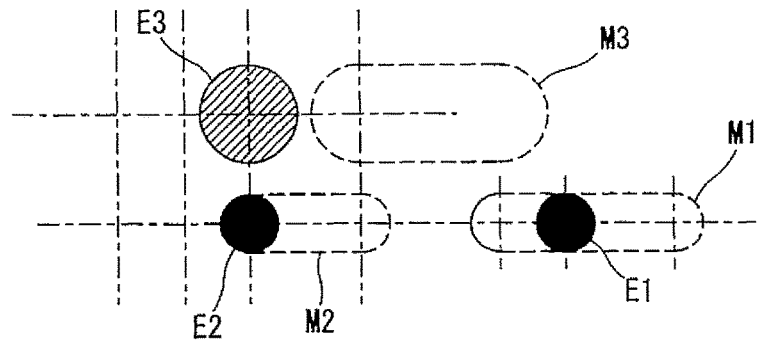

In a third state shown in FIG. 13C after the second state, only the third opening portion M3 is in the non-communication state, and the first and second opening portions M1 and M2 are in the communication state. With this, in the third state, by these communication states, the cooling water is supplied to the heater heat exchanger HT and the oil cooler OC from the first and second exhaust ports E1 and E2 through the first and second pipes L1 and L2, and their supply amounts are changed according to respective overlap amounts between the first exhaust port E1 and the first opening portion M1 and between the second exhaust port E2 and the second opening portion M2.

Figure 13D:
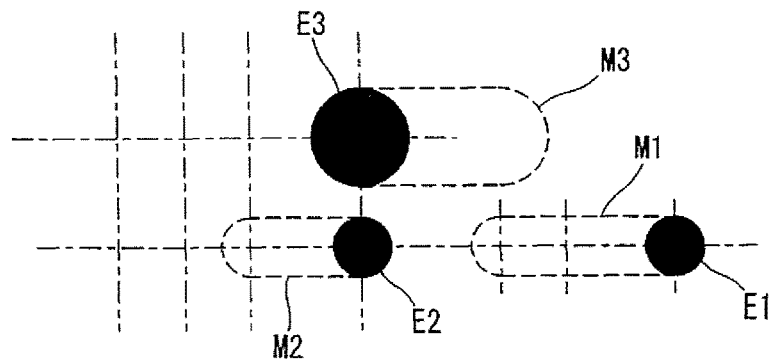

In a fourth state shown in FIG. 13D after the third state, all the first to third opening portions M1 to M3 are in the communication state in which the opening portions M1 to M3 communicate with the exhaust ports E1 to E3 respectively. With this, in the fourth state, the cooling water is supplied to all of the heater heat exchanger HT, the oil cooler OC and the radiator RD, and their supply amounts are changed according to respective overlap amounts between the first exhaust port E1 and the first opening portion M1, between the second exhaust port E2 and the second opening portion M2 and between the third exhaust port E3 and the third opening portion M3.

In the following, distinctive working and effect of the flow rate control valve CV according to the present embodiment will be explained with reference to FIGS. 4, 8 and 9. In FIG. 9, a bold solid arrow indicates the main flow (a flow of the cooling water that directly flows into the inner peripheral side passage 17 from the introduction opening 10). A fine solid arrow indicates the bypass flow of the cooling water that flows into the inner peripheral side passage 17 from the outer peripheral side passage 18 through the auxiliary intake port M4 then flows into the third exhaust port E3. A fine broken arrow indicates the bypass flow of the cooling water that directly flows into the third exhaust port E3 from the outer peripheral side passage 18 through the third opening portion M3.

In a case of the conventional flow rate control valve, the conventional flow rate control valve has a structure in which the inner peripheral side passage of the valve body has a substantially constant inside diameter, and the cooling water flows into each exhaust port formed on the peripheral wall of the housing and having an inside diameter that is sufficiently smaller than the inside diameter of the inner peripheral side passage from the inner peripheral side passage through each opening portion formed on the peripheral wall of the valve body. Because of this, stagnation of the flow of the cooling water flowing from the inner peripheral side passage into each exhaust port occurs due to rapid reduction of the opening cross section of the flow passage, then this causes a problem of increasing a flow resistance of the cooling water.

In contrast to this, in a case of the flow rate control valve CV, as shown in FIG. 4, the opening cross section in the axial direction of the valve body accommodating portion 13 is reduced from the introduction opening 10 that is the maximum opening to the valve body accommodating portion 13 whose opening is slightly smaller than the introduction opening 10. Further, the passage is divided into the inner peripheral side passage 17 and the outer peripheral side passage 18 from the opening of the valve body accommodating portion 13, and the flow passage sectional area of the inner peripheral side passage 17 forming the main flow is gradually reduced from the inflow port 3a to the third opening portion M3 (the third exhaust port E3) by the tapered portion 30.

As described above, according to the flow rate control valve CV of the present invention, since the opening cross section in the axial direction of the valve body accommodating portion 13 is reduced from the introduction opening 10 toward the third exhaust port E3, rapid reduction of the flow passage sectional area of the cooling water can be suppressed, and the flow resistance of the cooling water can be decreased.

Further, in the flow rate control valve CV, the inner peripheral surface of the valve body 3 is formed as the tapered portion 30 having such cone tapered shape that the diameter of the inner peripheral surface of the valve body 3 is gradually reduced toward the third opening portion M3 side. Therefore, since the opening cross section is gradually reduced, it is possible to effectively decrease the flow resistance of the cooling water.

Furthermore, in the flow rate control valve CV, the valve body accommodating portion 13 has therein the inner peripheral side passage 17 and the outer peripheral side passage 18 at inner and outer peripheral sides of the valve body 3. Therefore, the opening cross section is merely reduced from the introduction opening 10 to the valve body accommodating portion 13, and a reduction amount of the flow passage sectional area of the cooling water can be lowered as compared with the conventional flow rate control valve in which change of reduction of flow passage sectional area from the introduction opening 10 to the inner peripheral side passage 17 of the valve body 3 is large. It is therefore possible to further decrease the flow resistance of the cooling water.

Moreover, since the valve body 3 is provided with the auxiliary intake port M4, a part of the bypass flow of the outer peripheral side passage 18 can be joined with the main flow of the inner peripheral side passage 17 through the auxiliary intake port M4. With this, the reduction amount of the opening cross section of the valve body accommodating portion 13 is substantially a reduction amount by the tapered portion 30, and the flow passage sectional area is reduced stepwise.

In addition, in the flow rate control valve CV, the bypass flow of the cooling water of the outer peripheral side passage 18 can directly flow into the third exhaust port E3 not only through the auxiliary intake port M4, but also through the long-hole-shaped third opening portion M3 that extends along the circumferential direction of the valve body 3. Therefore, in addition to the stepwise reduction of the flow passage sectional area, it is possible to further decrease the flow resistance of the cooling water.

First Modified Example

Figure 16A:
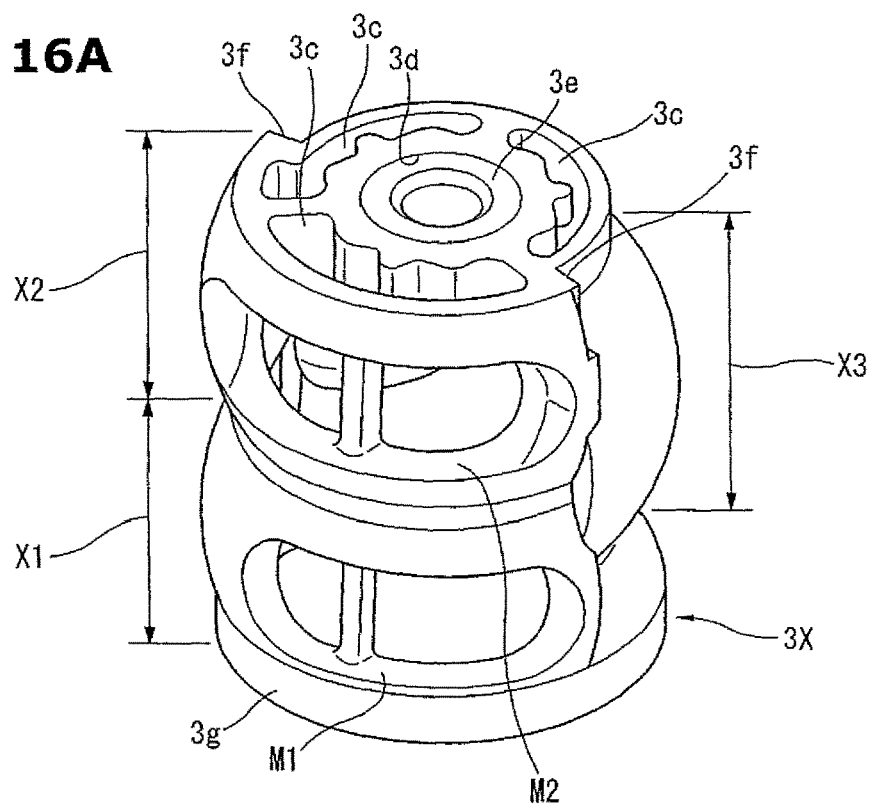
FIGS. 16A and 16B are a first modified example of the valve body shown in FIG. 11.
Figure 16B:
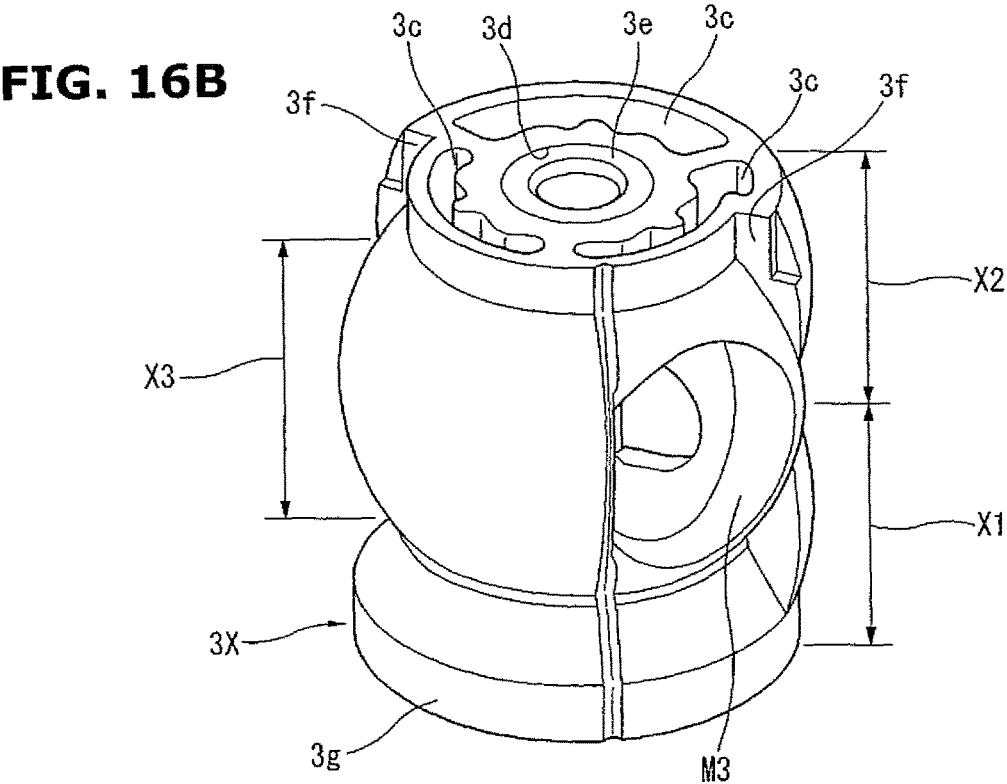
Figure 17:
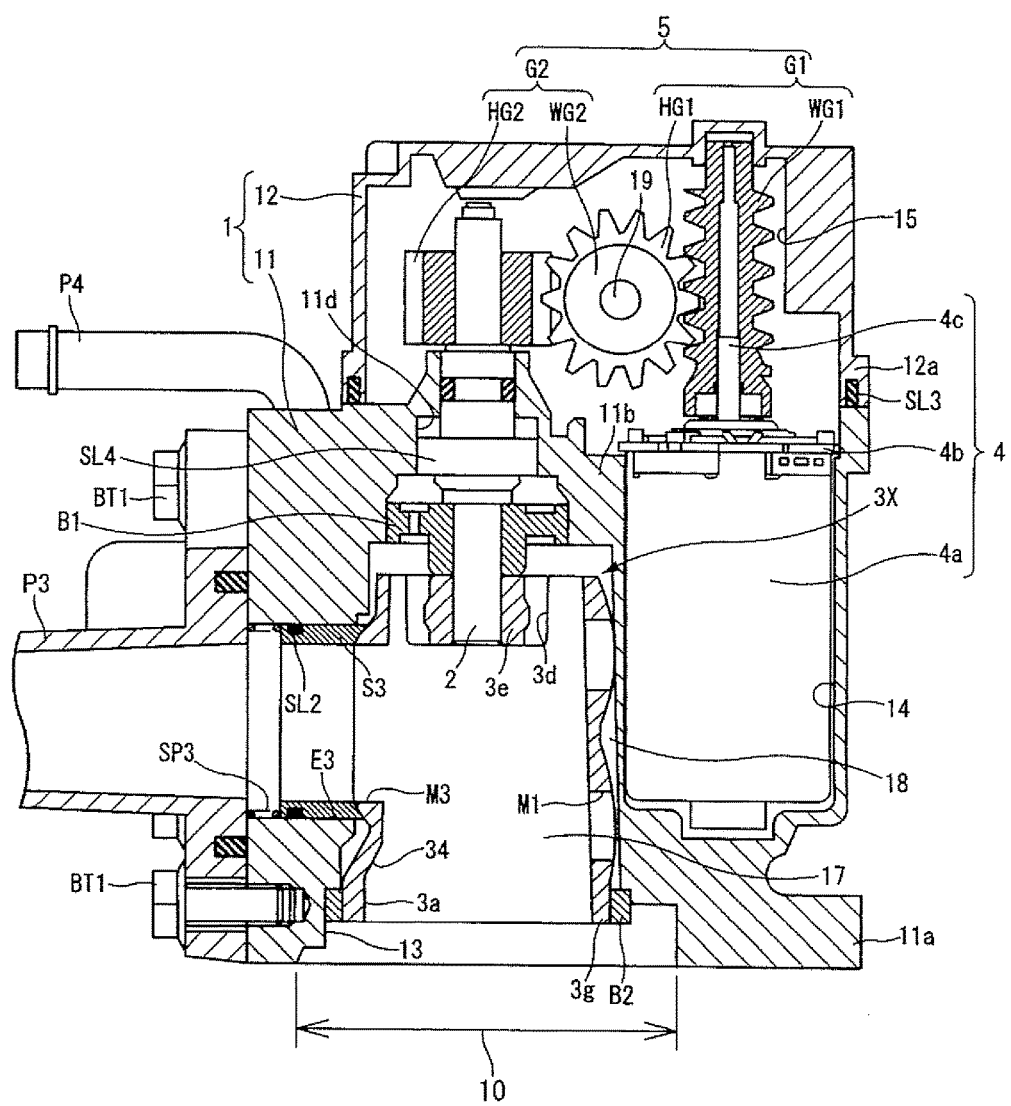
FIG. 17 is a drawing showing a flow rate control valve having the valve body of FIG. 16, which corresponds to FIG. 10.

FIGS. 16A and 16B and 17 show a first modified example of the first embodiment of the flow rate control valve according to the present invention. In the first modified example, a structure of the valve body 3, more specifically, shape and arrangement of each of the first to third opening portions M1 to M3, are changed. Also in the present modified example, the same structure (element or component) as that of the first embodiment is denoted by the same reference sign as that of the first embodiment, and its detailed explanation will be omitted.

That is, as shown in FIG. 16, a valve body 3X has a structure in which the first opening portion M1 and the second opening portion M2 are arranged in different axial direction sections X1 and X2, and a third axial direction section X3 that is different from the axial direction sections X1 and X2 is formed, and the third opening portion M3 is arranged in the third axial direction section X3. Further, in the present modified example, as shown in FIG. 17, a tapered portion 34 having the cone tapered shape, which is similar to the first embodiment, is provided at an axial direction middle portion between the inflow port 3a of the valve body 3X and the third opening portion M3.

The first modified example also has the same working and effects as those of the first embodiment by the tapered portion 34. Further, by arranging the first to third opening portions M1 to M3 in the different axial direction sections X1 to X3, an outside diameter of each of the axial direction sections X1 to X3. i.e. an entire outside diameter of the valve body 3X, can be reduced, and this can reduce a size of the valve body 3X, which brings about size reduction of the flow rate control valve CV.

Second Modified Example

Figure 18:
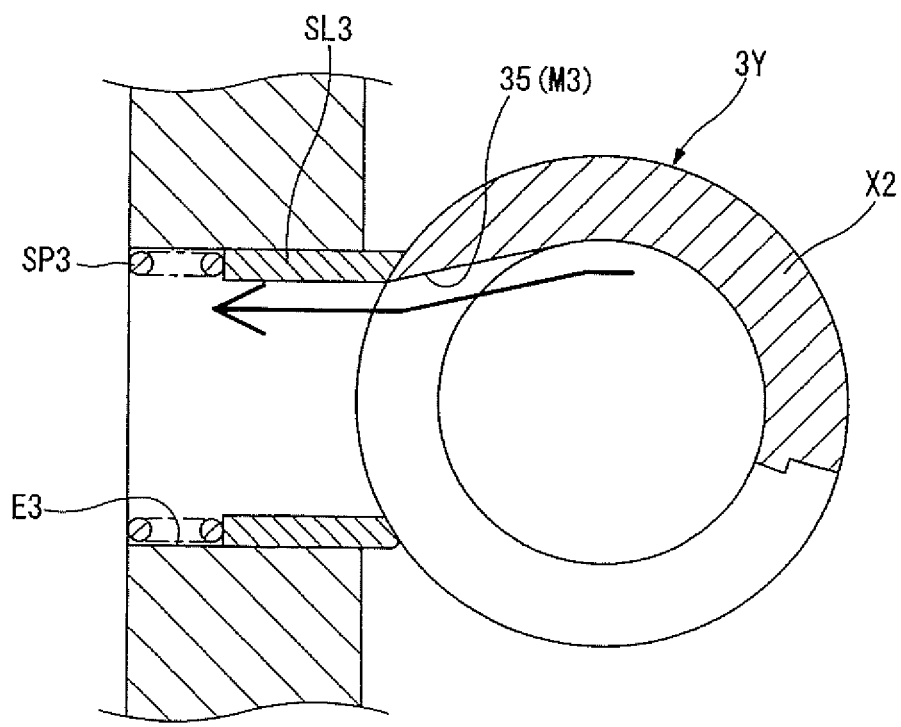
FIG. 18 is a second modified example, which corresponds to a sectional view taken along a line F-F of FIG. 4.

FIG. 18 shows a second modified example of the first embodiment of the flow rate control valve according to the present invention. In the second modified example, a structure of the valve body 3, more specifically, structure of each of the first to third opening portions M1 to M3, is changed. FIG. 18 corresponds to a sectional view taken along a line F-F of FIG. 4. For convenience, although only the third opening portion M3 is shown, the other first and second opening portions M1 and M2 have the same structure as the third opening portion M3. Also in the present modified example, the same structure (element or component) as that of the first embodiment is denoted by the same reference sign as that of the first embodiment, and its detailed explanation will be omitted.

That is, a valve body 3Y has a structure in which, in addition to the structure of the valve body 3 of the first embodiment, an inner peripheral surface of each of the first to third opening portions M1 to M3 is formed by a tapered portion 35 having a cone tapered shape whose opening cross section is gradually reduced from a radial direction inner side toward a radial direction outer side.

As described above, in the second modified example, each tapered portion 35 is provided between the inner peripheral side passage 17 and each of the exhaust ports E1 to E3 where the flow passage sectional area is relatively greatly reduced from the inner peripheral side passage 17. Therefore, the flow resistance at the part where the stagnation of the flow of the cooling water tends to occur can be effectively decreased. Then, also by the reduction of the opening cross section in the axial direction of the valve body accommodating portion 13 between the introduction opening 10 and the third exhaust port E3, it is possible to further decrease the flow resistance of the cooling water.

Second Embodiment

Figure 19:
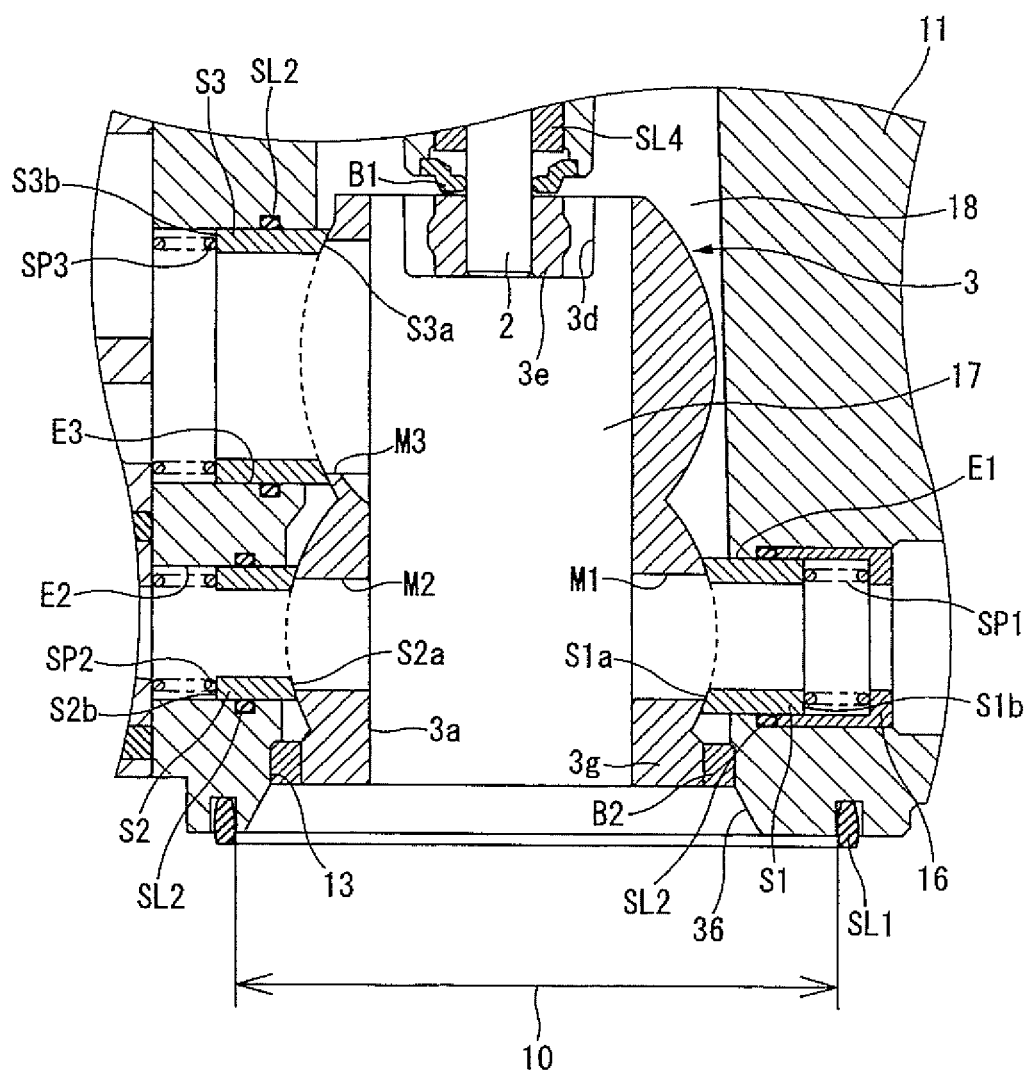
FIG. 19 is a second embodiment of the flow rate control valve of the present invention, which corresponds to FIG. 4.

FIG. 19 shows a second embodiment of the flow rate control valve according to the present invention. In the second embodiment, arrangement or position of the tapered portion 30 of the first embodiment is changed. Also in the present embodiment, the same structure (element or component) as that of the first embodiment is denoted by the same reference sign as that of the first embodiment, and its detailed explanation will be omitted.

That is, in the present embodiment, the tapered portion 30 is removed. Then, instead of the tapered portion 30, a tapered portion 36 having such cone tapered shape that a diameter of an inner peripheral surface of the first housing 11 is gradually reduced toward the other side of the first housing 11 in the axial direction of the valve body accommodating portion 13 from the introduction opening 10 to the valve body accommodating portion 13 is provided. By this tapered portion 36, "the reduction of the opening cross section in the axial direction of the valve body accommodating portion 13 between the introduction opening 10 and the third exhaust port E3" according to the present invention is realized.

Figure 20:
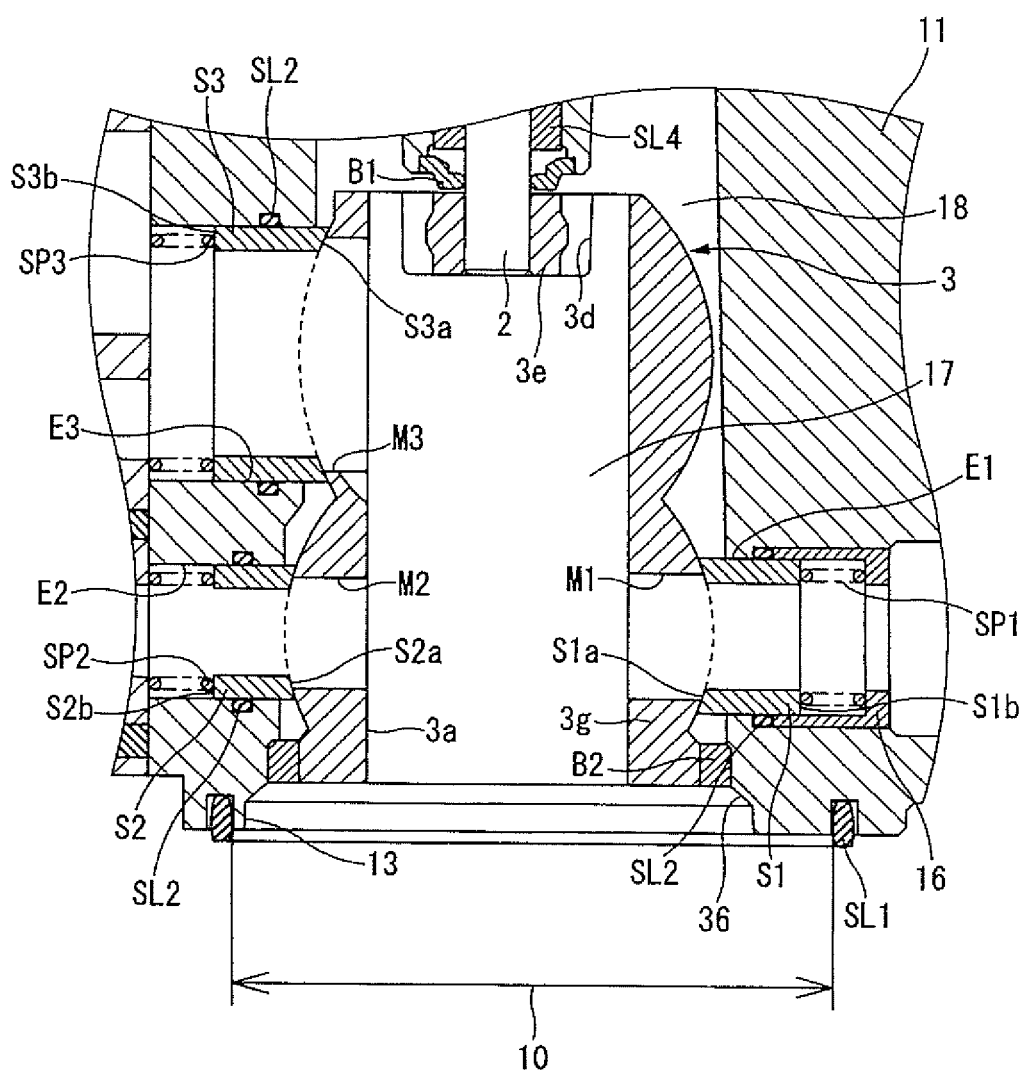
FIG. 20 is a sectional view of a main part, corresponding to a tapered portion of FIG. 19, of the flow rate control valve according to other example.

Here, as the tapered portion according to the present invention, besides the tapered portion 36 shown in FIG. 19, for instance, as shown in FIG. 20, the opening cross section could be reduced by forming only a part of the inner peripheral surface of the first housing 11 from the introduction opening 10 to the valve body accommodating portion 13 to the cone tapered shape (by forming the tapered portion 36 only at a part of the inner peripheral surface of the first housing 11 from the introduction opening 10 to the valve body accommodating portion 13).

As described above, also by the present embodiment, the reduction of the opening cross section (the flow passage sectional area) from the introduction opening 10 to the valve body accommodating portion 13 can be achieved by the tapered portion 36, and the same working and effects as those of the first embodiment are obtained.

The present invention is not limited to the above structure or configuration shown in each embodiment and example. For instance, size of the first to third exhaust ports E1 to E3, shape, arrangement (circumferential position) and the number of the first to third opening portions M1 to M3, angle and the number of the tapered portions 30 to 36, could be arbitrarily changed according to specifications of shape of the valve body 3 and the first housing 11, as long as the working and effects of the present invention can be obtained.

Figure 21:
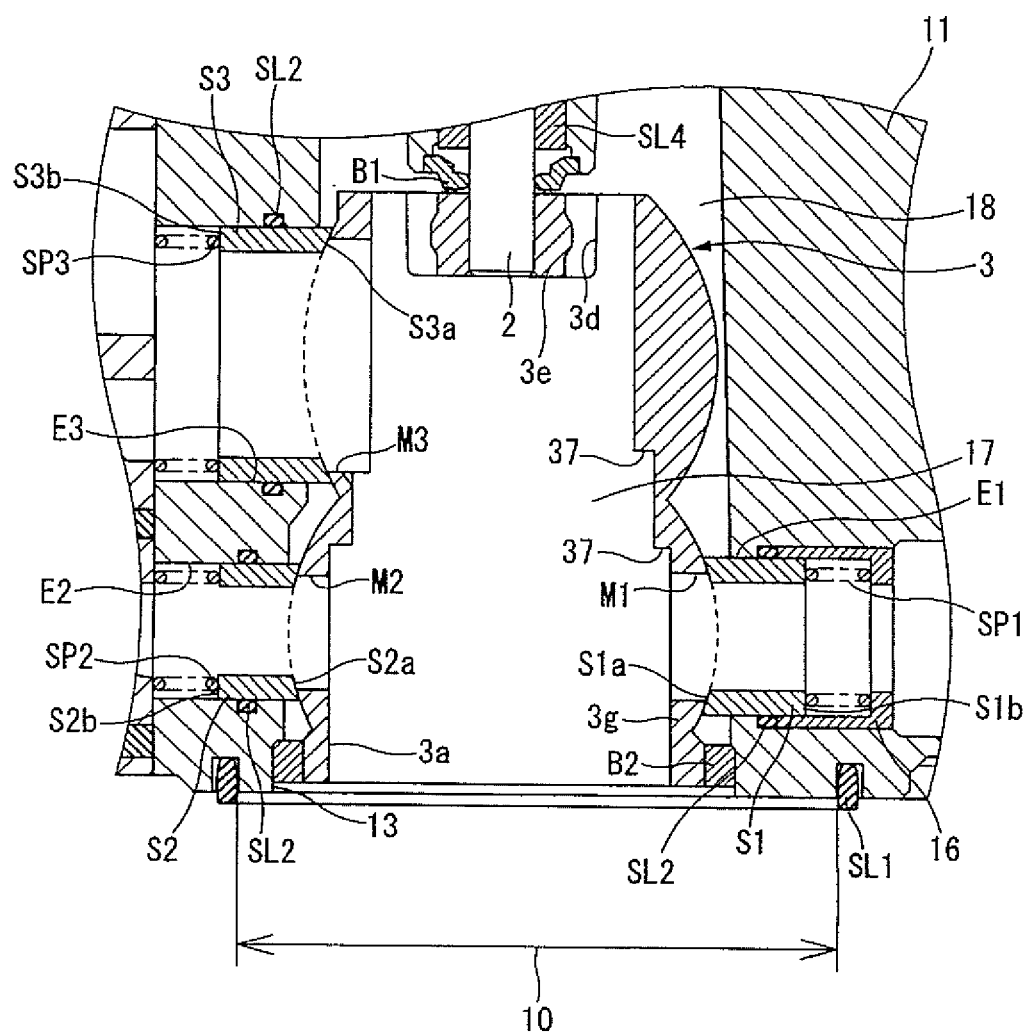
FIG. 21 is another embodiment showing a main part of the flow rate control valve of the present invention, which is other example of the flow rate control valve of FIG. 15.

Although each embodiment and example shows that the opening cross section between the introduction opening 10 and the third exhaust port E3 is gradually reduced in the axial direction of the valve body accommodating portion 13, as content or point of the present invention, the opening cross section located between the introduction opening 10 and each of the exhaust ports E1 to E3 is changed to be smaller in the axial direction of the valve body accommodating portion 13. And, the present invention is not limited to the structure in which the opening cross section is gradually reduced by the tapered portions 30 to 36 shown in the above embodiments and examples. For instance, as shown in FIG. 21, the reduction of the opening cross section could be achieved by forming an inner peripheral portion of the barrel-shaped or cylindrical valve body 3 into stepped portions 37 whose longitudinal section is a substantially right angle or square.

Further, the structures of the tapered portions 30 to 36 are not limited to the structures of the tapered portions 30 to 36 shown in the above embodiments and examples. Each structure could be combined as necessary according to specifications of the flow rate control valve CV. For instance, by combining the tapered portion 30 of the first embodiment and the tapered portion 35 of the second modified example, or by combining the tapered portion 30 of the first embodiment and the tapered portion 36 of the second embodiment, the opening cross section toward the exhaust ports E1 to E3 can be reduced even stepwise. It is therefore possible to effectively decrease the flow resistance of the cooling water.

Furthermore, each embodiment and example shows an example in which the flow rate control valve CV is applied to the circulating system of the cooling water. However, the flow rate control valve CV can be applied to, not only the circulating system of the cooling water, but also a circulating system of working fluid such as lubricating oil.

As the flow rate control valve based on the embodiments and examples explained above, for instance, the followings are raised.

As one aspect of the present invention, a flow rate control valve comprising: a housing having an introduction opening which is formed so as to open in an axial direction of a hollow valve body accommodating portion and introduces fluid; and a plurality of exhaust ports, each of which is formed so as to have an opening cross section that is smaller than an opening cross section of the introduction opening, communicates with the valve body accommodating portion in a radial direction and exhausts the fluid in the valve body accommodating portion; and a valve body rotatably supported in the valve body accommodating portion and having a plurality of opening portions whose overlap state with the exhaust ports is changed according to a rotation position of the valve body, and an opening cross section between the introduction opening and at least one of the exhaust ports being reduced in the axial direction of the valve body accommodating portion.

As a preferable aspect of the flow rate control valve, a bypass passage in which the fluid flows is provided at an outer peripheral side of the valve body in the valve body accommodating portion.

As another preferable aspect of the flow rate control valve, in the above flow rate control valve, the valve body is provided with a bypass hole that communicates with the bypass passage.

As another preferable aspect of the flow rate control valve, in the above flow rate control valve, a bearing for rotatably supporting the valve body is provided between the introduction opening and the bypass passage.

As another preferable aspect of the flow rate control valve, in the above flow rate control valve, the opening cross section is changed to be gradually smaller.

As another preferable aspect of the flow rate control valve, in the above flow rate control valve, an opening cross section of an inside of the valve body among the opening cross section is changed to be gradually smaller.

As another preferable aspect of the flow rate control valve, in the above flow rate control valve, the opening cross section is changed to be gradually smaller by forming an inner peripheral surface of the valve body into such cone tapered shape as to be gradually reduced toward the opening portion side in the axial direction of the valve body accommodating portion.

As another preferable aspect of the flow rate control valve, in the above flow rate control valve, the opening cross section is changed to be gradually smaller by forming an inner peripheral surface of the valve body into such stepped shape as to be reduced stepwise toward the opening portion side in the axial direction of the valve body accommodating portion.

As another preferable aspect of the flow rate control valve, in the above flow rate control valve, the opening cross section is changed to be gradually smaller by gradually reducing an inside diameter of the housing toward the exhaust port side in the axial direction of the valve body accommodating portion.

As another preferable aspect of the flow rate control valve, in the above flow rate control valve, the opening cross section is changed to be gradually smaller by forming an inner peripheral surface of the housing into such cone tapered shape as to be gradually reduced toward the exhaust port side in the axial direction of the valve body accommodating portion.

As another preferable aspect of the flow rate control valve, in the above flow rate control valve, the opening cross section is changed to be gradually smaller by forming an inner peripheral surface of the housing into such stepped shape as to be reduced stepwise toward the exhaust port side in an axial direction of the valve body.

As another preferable aspect of the flow rate control valve, in the above flow rate control valve, the plurality of opening portions are arranged at different circumferential direction positions on an outer periphery of the valve body, and at least parts of the opening portions overlap with each other in an axial direction of the valve body.

As another preferable aspect of the flow rate control valve, in the above flow rate control valve, at least one of the exhaust ports is connected to a radiator for cooling an internal combustion engine.

From the other view point, a flow rate control valve comprising: a housing having an introduction opening which is formed so as to open in an axial direction of a hollow valve body accommodating portion and introduces fluid; and a plurality of exhaust ports, each of which is formed so as to have an opening cross section that is smaller than an opening cross section of the introduction opening, communicates with the valve body accommodating portion in a radial direction and exhausts the fluid in the valve body accommodating portion; a valve body rotatably supported in the valve body accommodating portion and having a plurality of opening portions whose overlap state with the exhaust ports is changed according to a rotation position of the valve body; and a bypass passage which is provided at an outer peripheral side of the valve body in the valve body accommodating portion, and in which the fluid flows.

As another preferable aspect of the flow rate control valve, the valve body is provided with a bypass hole that communicates with the bypass passage.

Further, from the other view point, a flow rate control valve comprising: a housing having an introduction opening which is formed so as to open in an axial direction of a hollow valve body accommodating portion and introduces fluid; and a plurality of exhaust ports, each of which is formed so as to have an opening cross section that is smaller than an opening cross section of the introduction opening, communicates with the valve body accommodating portion in a radial direction and exhausts the fluid in the valve body accommodating portion; and a valve body rotatably supported in the valve body accommodating portion and having a plurality of opening portions whose overlap state with the exhaust ports is changed according to a rotation position of the valve body, and an opening cross section of the housing or the valve body between the introduction opening and at least one of the exhaust ports being gradually reduced in the axial direction of the valve body accommodating portion.

The invention claimed is:
1. A flow rate control valve comprising:
a housing having
an introduction opening which is formed so as to open in an axial direction of a hollow valve body accommodating portion and to introduce fluid; and
a plurality of exhaust ports, each of which is formed so as to have an opening cross section that is smaller than an opening cross section of the introduction opening, to communicate with the valve body accommodating portion in a radial direction and to exhaust the fluid in the valve body accommodating portion; and
a valve body rotatably supported in the valve body accommodating portion and having a plurality of opening portions whose overlap state with the exhaust ports is changed according to a rotation position of the valve body, and
an opening cross section between the introduction opening and at least one of the exhaust ports being structured to be reduced in the axial direction of the valve body accommodating portion, wherein the opening cross section is configured to be changed to be gradually smaller.

2. The flow rate control valve as claimed in claim 1, wherein:
a bypass passage structured to allow the fluid to flow in the bypass passage is provided at an outer peripheral side of the valve body in the valve body accommodating portion.

3. The flow rate control valve as claimed in claim 2, wherein:
the valve body is provided with a bypass hole that communicates with the bypass passage.

4. The flow rate control valve as claimed in claim 3, wherein:
a bearing for rotatably supporting the valve body is provided between the introduction opening and the bypass passage.

5. The flow rate control valve as claimed in claim 1, wherein:
within the opening cross section, an opening cross section of an inside of the valve body is configured to be changed to be gradually smaller.

6. The flow rate control valve as claimed in claim 5, wherein:
the opening cross section is changed to be gradually smaller by forming an inner peripheral surface of the valve body into such a cone tapered shape as to be gradually reduced toward an opening portion side in the axial direction of the valve body accommodating portion.

7. The flow rate control valve as claimed in claim 5, wherein:
the opening cross section is changed to be gradually smaller by forming an inner peripheral surface of the valve body into such a stepped shape as to be reduced stepwise toward an opening portion side in the axial direction of the valve body accommodating portion.

8. The flow rate control valve as claimed in claim 1, wherein:
the opening cross section is changed to be gradually smaller by gradually reducing an inside diameter of the housing toward an exhaust port side in the axial direction of the valve body accommodating portion.

9. The flow rate control valve as claimed in claim 8, wherein:
the opening cross section is changed to be gradually smaller by forming an inner peripheral surface of the housing into such a cone tapered shape as to be gradually reduced toward the exhaust port side in the axial direction of the valve body accommodating portion.

10. The flow rate control valve as claimed in claim 8, wherein:
the opening cross section is changed to be gradually smaller by forming an inner peripheral surface of the housing into such a stepped shape as to be reduced stepwise toward the exhaust port side in an axial direction of the valve body.

11. The flow rate control valve as claimed in claim 1, wherein:
the plurality of opening portions are arranged at different circumferential direction positions on an outer periphery of the valve body, and at least parts of the opening portions overlap with each other in the axial direction of the valve body.

12. The flow rate control valve as claimed in claim 1, wherein:
at least one of the exhaust ports is connected to a radiator for cooling an internal combustion engine.

13. A flow rate control valve comprising:
a housing having
an introduction opening which is formed so as to open in an axial direction of a hollow valve body accommodating portion and to introduce fluid; and
a plurality of exhaust ports, each of which is formed so as to have an opening cross section that is smaller than an opening cross section of the introduction opening, to communicate with the valve body accommodating portion in a radial direction and to exhaust the fluid in the valve body accommodating portion;
a valve body rotatably supported in the valve body accommodating portion and having a plurality of opening portions whose overlap state with the exhaust ports is changed according to a rotation position of the valve body; and
a bypass passage which is provided at an outer peripheral side of the valve body in the valve body accommodating portion, and which is structured to allow the fluid to flow in the bypass passage.

14. The flow rate control valve as claimed in claim 13, wherein:
the valve body is provided with a bypass hole that communicates with the bypass passage.

15. A flow rate control valve comprising:
a housing having
an introduction opening which is formed so as to open in an axial direction of a hollow valve body accommodating portion and to introduce fluid; and
a plurality of exhaust ports, each of which is formed so as to have an opening cross section that is smaller than an opening cross section of the introduction opening, to communicate with the valve body accommodating portion in a radial direction and to exhaust the fluid in the valve body accommodating portion; and
a valve body rotatably supported in the valve body accommodating portion and having a plurality of opening portions whose overlap state with the exhaust ports is changed according to a rotation position of the valve body, and
an opening cross section of the housing or the valve body between the introduction opening and at least one of the exhaust ports being configured to be gradually reduced in the axial direction of the valve body accommodating portion.

* * * * *